US011157733B2

(12) United States Patent
Ackerman et al.

(10) Patent No.: US 11,157,733 B2
(45) Date of Patent: Oct. 26, 2021

(54) SYSTEMS AND METHODS OF ENHANCING BIOMETRIC MATCHING ACCURACY AND/OR EFFICIENCY

(71) Applicant: Princeton Identity, Inc., Hamilton, NJ (US)

(72) Inventors: David Alan Ackerman, Hopewell, NJ (US); Kenneth R. Boutot, Philadelphia, PA (US)

(73) Assignee: Princeton Identity, Inc., Hamilton, NJ (US)

( * ) Notice: Subject to any disclaimer, the term of this patent is extended or adjusted under 35 U.S.C. 154(b) by 170 days.

(21) Appl. No.: 16/675,546

(22) Filed: Nov. 6, 2019

(65) Prior Publication Data

US 2020/0143163 A1    May 7, 2020

Related U.S. Application Data

(60) Provisional application No. 62/756,138, filed on Nov. 6, 2018.

(51) Int. Cl.
*G06K 9/00* (2006.01)

(52) U.S. Cl.
CPC ..... *G06K 9/00617* (2013.01); *G06K 9/00597* (2013.01); *G06K 9/00604* (2013.01)

(58) Field of Classification Search
CPC .......... G06K 9/00617; G06K 9/00597; G06K 9/00604
USPC ...................................................... 382/117
See application file for complete search history.

(56) References Cited

U.S. PATENT DOCUMENTS

| 9,064,145 B2 | 6/2015 | Tan et al. |
| 2006/0074986 A1* | 4/2006 | Mallalieu ................. G07C 9/37 |
| 2017/0286790 A1* | 10/2017 | Mapen ............... G06K 9/00617 |
| 2017/0323167 A1 | 11/2017 | Mapen et al. |
| 2017/0337424 A1 | 11/2017 | Teverovskiy |

OTHER PUBLICATIONS

International Search Report of the International Searching Authority dated Jan. 30, 2020, issued in connection with International Application No. PCT/US2019/60029 (3 pages).
Written Opinion of the International Searching Authority dated Jan. 30, 2020, issued in connection with International Application No. PCT/US2019/60029 (6 pages).

* cited by examiner

*Primary Examiner* — Amandeep Saini
(74) *Attorney, Agent, or Firm* — McCarter & English, LLP

(57) ABSTRACT

Exemplary embodiments are directed to a system of enhancing biometric analysis matching. A processing device is configured to analyze the probe short-range and broadband iris texture information of a probe image for iris biometric authenticity, and based on the biometric authenticity of the probe short-range iris texture information and the probe broadband iris texture information, determine the biometric authenticity of the subject. Exemplary embodiments are also directed to a system of enhancing biometric analysis matching efficiency. The processing device generates an optimized order of enrollment iris biometric data includes a listing of the enrollment iris biometric data ordered by closest match to furthest match between the probe and enrollment broadband iris texture information. The processing device analyzes the iris biometric data for biometric authenticity starting with the closest match between the probe and enrollment broadband iris texture information.

20 Claims, 16 Drawing Sheets

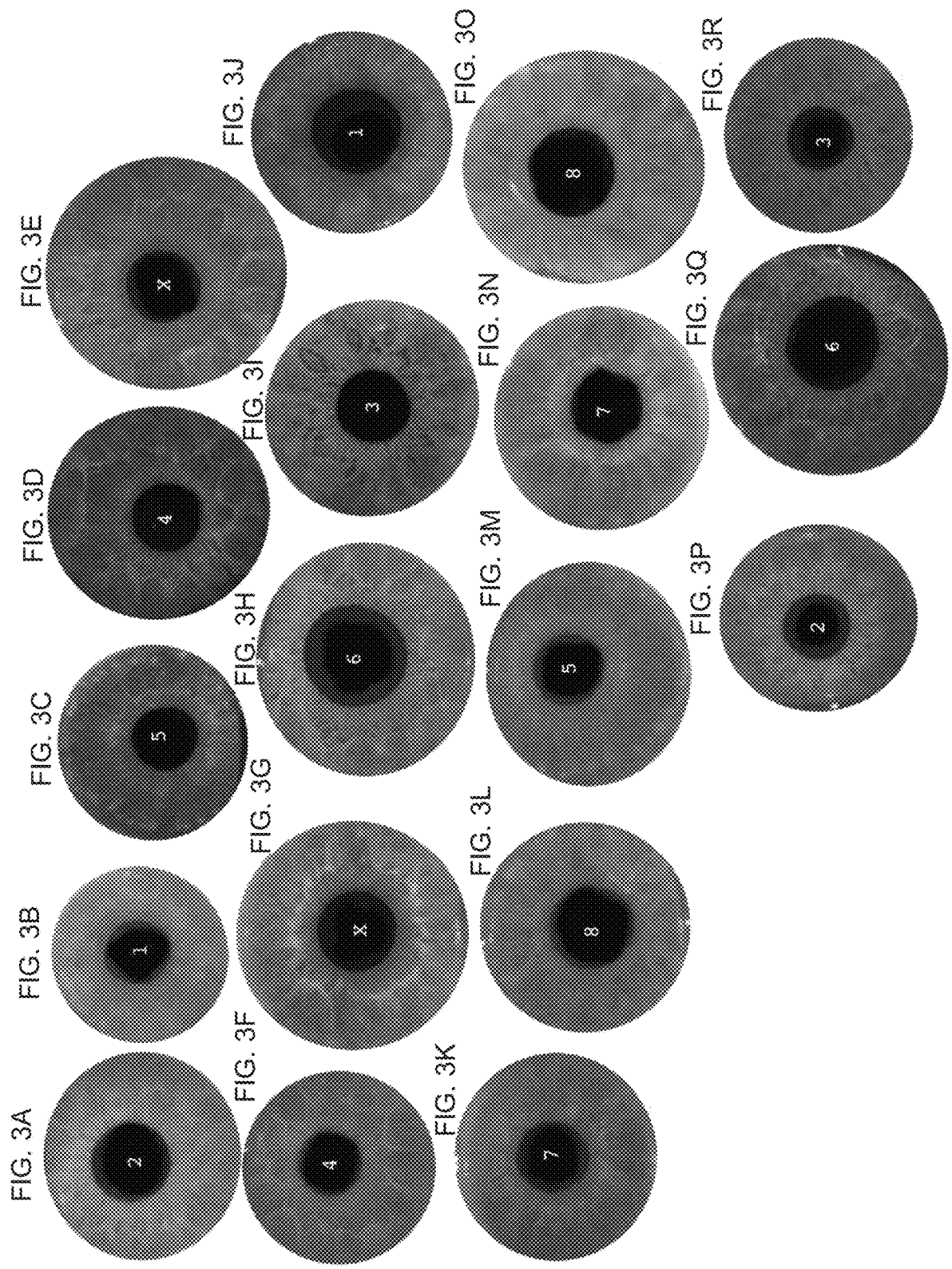

SYSTEMS AND METHODS OF ENHANCING BIOMETRIC MATCHING ACCURACY AND/OR EFFICIENCY

CROSS-REFERENCE TO RELATED APPLICATIONS

The present application claims the benefit of priority to U.S. Provisional Application No. 62/756,138, filed Nov. 6, 2018, which is hereby incorporated by reference in its entirety.

TECHNICAL FIELD

The present disclosure relates to systems and methods of enhancing biometric analysis matching accuracy based on short-range and broadband iris texture and/or enhancing biometric analysis matching efficiency based on broadband iris texture.

BACKGROUND

Security is a concern in a variety of transactions involving private information. Iris recognition is a well-accepted and accurate means of biometric identification used in government and commercial systems around the world that enables secure transactions and an added layer of security beyond keys and/or passwords. Due to the increased security provided by iris recognition systems, an increase in use of such systems has occurred around the world. As the size of databases of enrolled individuals increases, banks, hospitals, schools, stores, businesses, military installations, and other government and/or commercial systems could benefit from biometric analysis systems that improve the accuracy and efficiency of biometric verification.

A need exists for improved biometric analysis systems to improve the accuracy and efficiency of the authentication process. These and other needs are addressed by the systems and methods of the present disclosure.

SUMMARY

In accordance with embodiments of the present disclosure, an exemplary system of enhancing biometric analysis matching accuracy (e.g., a dual modality biometric analysis system) is provided. The system includes at least one camera and a processing device in communication with the at least one camera. The at least one camera can be configured to capture at least one probe image of an iris of a subject. The at least one probe image can have iris biometric data associated with the iris of the subject. The iris biometric data can include probe short-range iris texture information and probe broadband iris texture information. The processing device can be configured to receive as input the at least one probe image, analyze the probe short-range iris texture information of the at least one probe image for iris biometric authenticity, and analyze the probe broadband iris texture information of the at least one probe image for iris biometric authenticity. Based on the biometric authenticity of the probe short-range iris texture information and the probe broadband iris texture information, the processing device can be configured to determine the biometric authenticity of the subject, thereby preferably enhancing biometric analysis matching accuracy thereof.

As used herein, short-range iris texture refers to localized iris patterns or textures that are not human-readable, i.e., that are on a length scale finer than can be resolved by a human observer. The short-range iris textures survive filtering with a narrow band filter centered about a high spatial frequency with a short wavelength. The short-range iris textures are in the Daugman spatial frequency range of features traditionally used by biometric analysis systems. See, e.g., J. Daugman, "High Confidence Visual Recognition of Persons by A Test of Statistical Independence", *IEEE Trans. Pattern Anal. Machine Intelligence*, vol. 15, No. 11, pp. 1148-1161 (1993). Short-range iris textural features include fine iris features that are within the filter window of the Daugman iris-matching algorithm, and can be random with a large number of degrees of freedom. The short-range iris textures can be detected and visualized through the phase of a two-dimensional Gabor filter, and can be on the scale of approximately $\pm 10$ pixels, thereby limited to predetermined Gabor wavelets. It is assumed that the iris diameter is of about 80 pixels to about 400 pixels.

As used herein, broadband iris texture refers to extended iris patterns or textures that form durable, coarse, and human-readable or human-identifiable patterns, i.e., patterns that may be visually perceptible by a human that is observing the near infrared image of a subject iris. Broadband iris texture typically extends across multiple frequencies for which constituent lower frequencies may be human perceptible and constituent higher frequencies might not be visually perceptible, i.e., the broadband iris texture information relates to a physiological feature that may include information at multiple spatial frequencies of analysis, but does not necessarily do so. The broadband iris textures survive filtering with a low-pass filter with a cut-off at a low spatial frequency with a long wavelength. The broadband iris textures are detected and visualized generally outside of the Daugman spatial frequency range. The broadband iris texture can extend over large areas of territory of the iris, and can include some frequencies of the Daugman short-range iris texture. The broadband iris texture exceeds the pixel range of the Gabor filter, and can be one-dimensional or two-dimensional in nature. The broadband iris texture can be determined through human detected, automated and/or machine learning and/or vision, using vision algorithms including filtering or with neural networks. The broadband iris textural features can include, for example, crypts, sunbursts, branch cracks, rings of dots, flames, Wolfflin nodules, background texture, characteristics of the collarette, white-wall tires, combinations thereof, and other features that show up on near infrared iris images.

In some embodiments, the system can include at least one illumination source configured to illuminate an iris of a subject. The processing device can be in communication with the at least one illumination source. The at least one illumination source can be configured to illuminate the iris of the subject with near infrared light. The at least one camera can be configured to capture the at least one probe image of the iris of the subject during illumination of the subject with the at least one illumination source.

Analyzing the probe short-range iris texture information for biometric authenticity can include comparing the probe short-range iris texture information to enrollment short-range iris texture information. Analyzing the probe broadband iris texture information for biometric authenticity can include comparing the probe broadband iris texture information to enrollment broadband iris texture information. In some embodiments, example systems can compare the probe and enrollment broadband iris texture information for detection and determination of the existence and/or nature/quality of one or more broadband iris textures in the probe image, rather only specific size, shape, position, or the like, of the broadband iris texture. In some embodiments, it can be determined whether the broadband iris texture is in a specific position and/or of a specific size and/or whether the type of broadband iris texture of the enrollment image is detected in the probe image, thus preferably enhancing biometric analysis matching accuracy. As shall be discussed further herein, for example, a feature vector associated with broadband iris texture can include set members comprising background texture, collaret, crypts, and/or Wolfflin nodules, for example, and, each can be rated for example, on a scale of zero to three 0-3, while each other is rated on another scale.

In some embodiments, the processing device can be configured to apply the biometric authenticity determination based on the probe broadband iris texture information as a final deciding factor in the biometric authenticity of the subject. In some embodiments, the at least one probe image can include iris biometric data associated with left and right irises of the subject. In such embodiments, the processing device can be configured to analyze the probe short-range and broadband iris texture information for both the left and right irises of the subject.

In some embodiments, the processing device can be configured to generate a short-range score (e.g., a short-range iris dissimilarity score) corresponding with a degree to which the iris biometric authenticity is found for the probe short-range iris texture information. If the generated score for the iris biometric authenticity of the probe short-range iris texture information is better than (e.g., above) a short-range threshold value, the processing device can be configured to analyze the probe broadband iris texture information of the at least one probe image for the iris biometric authenticity. For example, a score of approximately 0 can correspond with a perfect match, while a score of over 0.33 can correspond with a non-match. In some embodiments, a score of 0.38 can be considered as the threshold value for a non-match. In some embodiments, broadband iris texture analysis can be performed if the generated short-range score is better than (e.g., above) 0.38. In some embodiments, the broadband iris texture analysis can be performed if the generated short-range score is greater than 0.2, thus preferably enhancing biometric analysis matching accuracy.

In some embodiments, the processing device can be configured to generate a broadband score (e.g., broadband iris dissimilarity score) corresponding with a degree to which the iris biometric authenticity is found for the probe broadband iris texture information. If the generated broadband score is better than (e.g., above) a broadband threshold value, positive biometric authenticity of the subject can be determined.

In accordance with embodiments of the present disclosure, an exemplary method of enhancing biometric analysis matching is provided. The method includes capturing at least one probe image of an iris of a subject with at least one camera. The at least one probe image can have iris biometric data associated with the iris of the subject. The iris biometric data can include probe short-range iris texture information and probe broadband iris texture information. The method includes receiving as input at a processing device the at least one probe image, analyzing, via the processing device, the probe short-range iris texture information of the at least one probe image for iris biometric authenticity, and analyzing, via the processing device, the probe broadband iris texture information of the at least one probe image for iris biometric authenticity. Based on the biometric authenticity of the probe short-range iris texture information and the probe broadband iris texture information, the method includes determining the biometric authenticity of the subject, thus preferably enhancing biometric analysis matching accuracy.

In some embodiments, the method can include illuminating the iris of the subject with at least one illumination source. In some embodiments, the method can include illuminating the iris of the subject with near infrared light from the at least one illumination source. In such embodiments, the method can include capturing the at least one probe image of the iris of the subject during illumination of the subject with the at least one illumination source.

Analyzing the probe short-range iris texture information for biometric authenticity can include comparing the probe short-range iris texture information to enrollment short-range iris texture information. Analyzing the probe broadband iris texture information for biometric authenticity can include comparing the probe broadband iris texture information to enrollment broadband iris texture information. In some embodiments, the method can include applying, via the processing device, the biometric authenticity determination based on the probe broadband iris texture information as a final deciding factor in the biometric authenticity of the subject.

In some embodiments, the at least one probe image can include iris biometric data associated with left and right irises of the subject. In such embodiments, the method can include analyzing, via the processing device, the probe short-range and broadband iris texture information for both the left and right irises of the subject. For example, rather than relying on authentication based on only the short and broadband iris texture information of the left iris of the subject, the short and broadband iris texture information for both the left and right irises can be analyzed relative to respective left and right iris enrollment images.

In accordance with embodiments of the present disclosure, an exemplary non-transitory computer-readable medium storing instructions for enhancing biometric analysis matching is provided. The instructions are executable by a processing device. Execution of the instructions by the processing device causes the processing device to capture at least one probe image of an iris of a subject with at least one camera. The at least one probe image can have iris biometric data associated with the iris of the subject. The iris biometric data can include probe short-range iris texture information and probe broadband iris texture information. Execution of the instructions by the processing device causes the processing device to receive as input at a processing device the at least one probe image, analyze, via the processing device, the probe short-range iris texture information of the at least one probe image for iris biometric authenticity, and analyze, via the processing device, the probe broadband iris texture information of the at least one probe image for iris biometric authenticity. Based on the biometric authenticity of the probe short-range iris texture information and the probe broadband iris texture information, execution of the instructions by the processing device causes the processing device to determine the biometric authenticity of the subject, thus preferably enhancing biometric analysis matching accuracy.

While systems and/or subsystem (and/or methods and/or sub-methods) for enhancing biometric analysis matching accuracy can be provided, systems and subsystems (and/or methods and/or sub-methods) can be provided for enhancing biometric analysis matching efficiency.

Regarding efficiency, in accordance with some embodiments of the present disclosure, an exemplary system enhancing biometric analysis efficiency is provided. The system includes at least one camera, a database, and a processing device in communication with the at least one camera and the database. The at least one camera is configured to capture at least one probe image of an iris of a subject. The at least one probe image has iris biometric data associated with the iris of the subject. The iris biometric data includes probe short-range iris texture information and probe broadband iris texture information. The database electronically stores enrollment iris biometric data including enrollment short-range iris texture information and enrollment broadband iris texture information.

The processing device is configured to receive as input the at least one probe image, and generate an optimized order of the enrollment iris biometric data based on biometric analysis of the probe broadband iris texture information relative to the enrollment broadband iris texture information. The optimized order includes a listing of the enrollment iris biometric data ordered by closest match to furthest match between the probe and enrollment broadband iris texture information. The processing device is configured to analyze the iris biometric data for biometric authenticity based on the probe and enrollment short-range iris texture information starting with the closest match between the probe and enrollment broadband iris texture information, thereby preferably enhancing biometric analysis matching efficiently.

In some embodiments, the system can include at least one illumination source configured to illuminate an iris of a subject. The processing device can be in communication with the at least one illumination source. In some embodiments, the at least one illumination source can be configured to illuminate the iris of the subject with near infrared (NIR) light. In such embodiments, the at least one camera can be configured to capture the at least one probe image of the iris of the subject during illumination of the subject with the at least one illumination source.

In some embodiments, biometric analysis of the probe broadband iris texture information relative to the enrollment broadband iris texture information can include generating a feature vector for each of the probe and enrollment broadband iris texture information. As discussed herein, a feature vector can represent the number of broadband iris texture features being analyzed and the magnitude of presence of such broadband iris texture features. For example, in feature vector ($F_1$, $F_2$, $F_N$), F represents each of broadband iris texture features, and N represents the number of broadband iris texture features. A magnitude of the numerical value for each broadband iris texture feature, for example (0, 1, 0) represents the presence or absence of the feature. In the (0, 1, 0) example, broadband features $F_1$ and $F_3$ are not present, while feature $F_2$ is present. Biometric analysis of the probe broadband iris texture information relative to the enrollment broadband iris texture information can include generating a set of distances between the feature vector of the probe broadband iris texture information and the feature vector of each of the enrollment broadband iris texture information. In some embodiments, the set of distances between the feature vectors can be defined by a Euclidian distance determination. However, a feature vector can include, for example, four features ($F_1$, $F_2$, $F_3$, $F_4$) with each on other types of scales, such as where each of $F_1$, $F_2$, $F_3$, and $F_4$ can be on a scale of zero to three (as opposed to zero to one in the above example).

The set of distances between the feature vectors can characterize a similarity between the feature vector of the probe and enrollment broadband iris texture information. For example, a small distance between the feature vectors of the probe and enrollment broadband iris texture information can correspond with a high or close match between the probe and enrollment broadband iris texture information. Similarly, a large distance between the feature vectors of the probe and enrollment broadband iris texture information can correspond with a non-match or far (e.g., low) match between the probe and enrollment broadband iris texture information.

In some embodiments, analyzing the iris biometric data for biometric authenticity comprises comparing the probe short-range iris texture information to the enrollment short-range iris texture information. In some embodiments, the at least one probe image can include iris biometric data associated with left and right irises of the subject. In such embodiments, the processing device can be configured to generate the optimized order of the enrollment iris biometric data for both the left and right irises of the subject. For example, a first optimized order for the left iris enrollment biometric data can be generated, and a second optimized order for the right iris enrollment biometric data can be generated, such that independent (or simultaneous) matching of the left and right iris probe images can be performed to the respective first and second optimized orders.

In accordance with embodiments of the present disclosure, an exemplary method of enhancing biometric analysis matching efficiency is provided. The method includes capturing at least one probe image of an iris of a subject with at least one camera. The at least one probe image has iris biometric data associated with the iris of the subject. The iris biometric data includes probe short-range iris texture information and probe broadband iris texture information. The method includes receiving as input at a processing device the at least one probe image, and generating, via the processing device, an optimized order of enrollment iris biometric data electronically stored in a database based on biometric analysis of the probe broadband iris texture information relative to enrollment broadband iris texture information, thereby preferably enhancing biometric analysis matching efficiently. The optimized order can include a listing of the enrollment iris biometric data ordered by closest match to furthest match between the probe and enrollment broadband iris texture information. The method includes analyzing, via the processing device, the iris biometric data for biometric authenticity based on the probe short-range iris texture information and enrollment short-range iris texture information starting with the closest match between the probe and enrollment broadband texture information.

In some embodiments, the method can include illuminating the iris of the subject with near infrared light from at least one illumination source. In some embodiments, the method can include generating a feature vector for each of the probe and enrollment broadband iris texture information, and generating a set of distances between the feature vector of the probe broadband iris texture information and the feature vector of each of the enrollment broadband iris texture information. In such embodiments, a small distance between the feature vectors of the probe and enrollment broadband iris texture information can correspond with a close match between the probe and enrollment broadband iris texture information, and a large distance between the feature vectors of the probe and enrollment broadband iris texture information can correspond with a far (e.g., low) match between the probe and enrollment broadband iris texture information.

In accordance with embodiments of the present disclosure, an exemplary non-transitory computer-readable medium storing instructions for enhancing biometric analysis matching efficiency is provided. The instructions are executable by a processing device. Execution of the instructions by the processing device causes the processing device to capture at least one probe image of an iris of a subject with at least one camera. The at least one probe image includes iris biometric data associated with the iris of the subject. The iris biometric data includes probe short-range iris texture information and probe broadband iris texture information.

Execution of the instructions by the processing device causes the processing device to receive as input at a processing device the at least one probe image, and generate, via the processing device, an optimized order of enrollment iris biometric data electronically stored in a database based on biometric analysis of the probe broadband iris texture information relative to enrollment broadband iris texture information, thereby preferably enhancing biometric analysis matching efficiently. The optimized order includes a listing of the enrollment iris biometric data ordered by closest match to furthest match between the probe and enrollment broadband iris texture information. Execution of the instructions by the processing device causes the processing device to analyze, via the processing device, the iris biometric data for biometric authenticity based on the probe short-range iris texture information and enrollment short-range iris texture information starting with the closest match between the probe and enrollment broadband texture information.

In accordance with embodiments of the present disclosure, an exemplary enhanced data storage efficiency system for a computer memory is provided. The system includes means for capturing at least one probe image of an iris of a subject. The at least one probe image has iris biometric data associated with the iris of the subject. The iris biometric data includes probe short-range iris texture information and probe broadband iris texture information. The system includes means for generating an optimized order of enrollment iris biometric data electronically stored in a database based on biometric analysis of the probe broadband iris texture information relative to enrollment broadband iris texture information. The optimized order includes a listing of the enrollment iris biometric data ordered by closest match to furthest match between the probe and enrollment broadband iris texture information. The method includes means for analyzing the iris biometric data for biometric authenticity based on the probe short-range iris texture information and enrollment short-range iris texture information starting with the closest match between the probe and enrollment broadband texture information.

While systems and/or subsystem (and/or methods and/or sub-methods) for enhancing biometric analysis matching accuracy can be provided, and while systems and subsystems (and/or methods and/or sub-methods) can be provided for enhancing biometric analysis matching efficiency, it is also contemplated that systems and/or subsystem (and/or methods and/or sub-methods) for enhancing both biometric analysis matching accuracy and efficiency can be provided Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed systems and methods of biometric analysis matching, reference is made to the accompanying figures, wherein:

FIGS. 3A-R are randomly mixed right and left iris pairs of eighteen subjects showing similarities in broadband or coarse features between the right and left irises.

DESCRIPTION OF EXEMPLARY EMBODIMENTS

Figure 1:
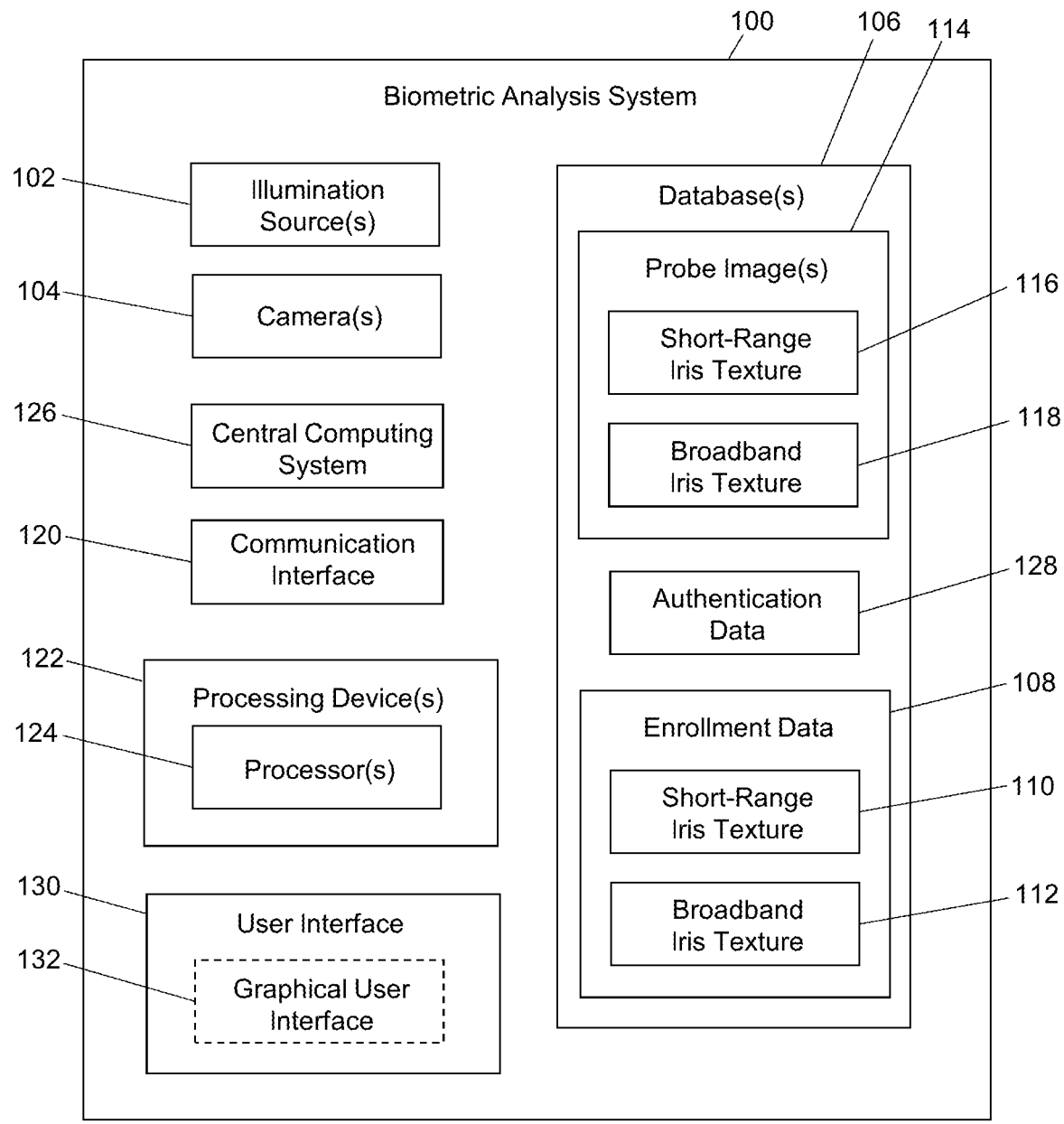
FIG. 1 is a block diagram of an exemplary system of enhancing biometric analysis matching accuracy in accordance with the present disclosure.
Figure 2A:
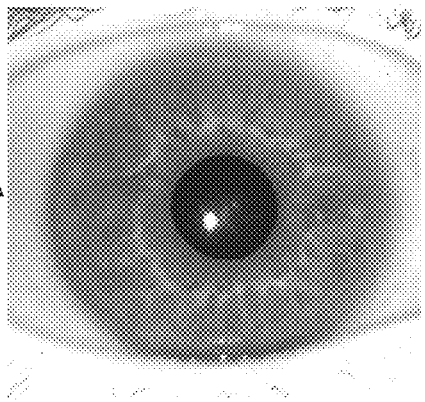
FIGS. 2A-H are right and left iris pairs of four subjects showing similarities in broadband or coarse features between the right and left irises.
Figure 2B:
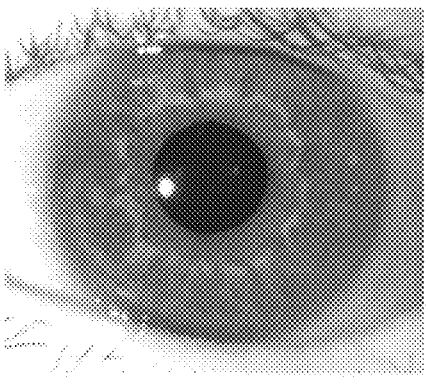
Figure 2C:
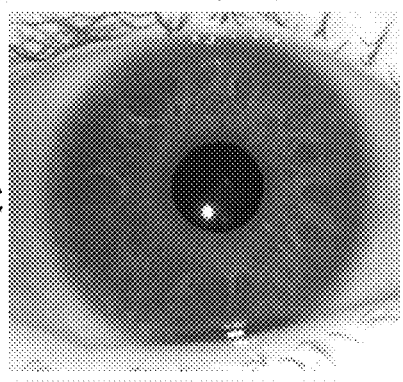
Figure 2D:
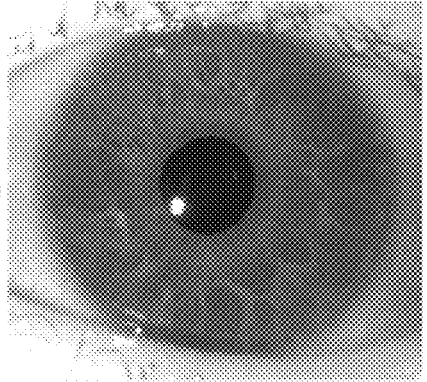
Figure 2E:
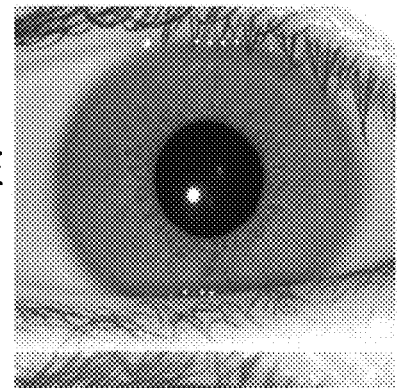
Figure 2F:
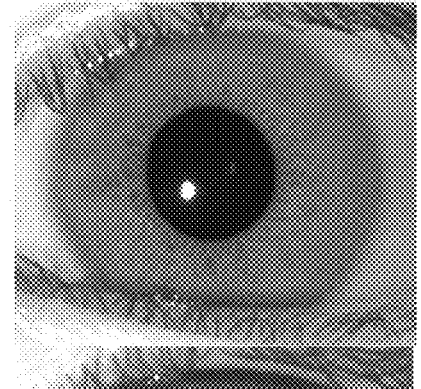
Figure 2G:
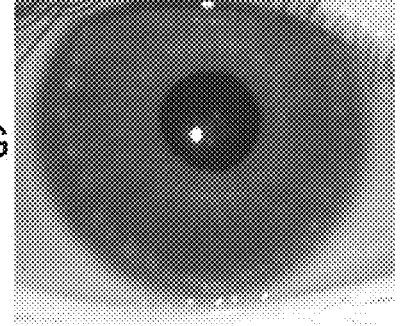
Figure 2H:
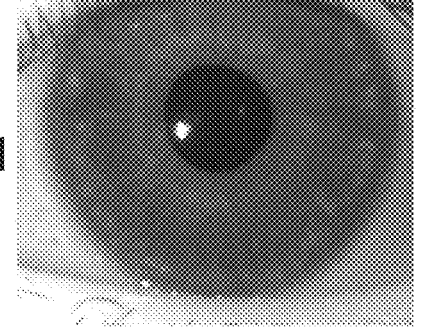

In accordance with embodiments of the present disclosure, exemplary systems of enhancing biometric analysis matching are provided that use a combination of short-range and broadband iris texture (e.g., dual modalities) to increase the confidence in the determination of whether a match between a presented and an enrolled iris is found. Increasing the confidence in the match determination allows the system to efficiently authenticate a subject without additional probe image capture. For example, if a low-confidence match is found based on the short-range iris features, rather than capturing an additional probe image to ensure the match, the system can rely on the broadband iris features captured in the same image to confirm a positive match. As used herein, a low-confidence match can refer to a "gray zone" for a match somewhere in the range between a high-confidence match and a high-confidence non-match, or a match having a match score better than (e.g., above) a threshold value.

The exemplary system analyzes iris texture for the purpose of iris recognition in which iris characteristics identified by deep learning networks (e.g., neural networks, computational vision algorithms, or the like) are used as a second modality in conjunction with short-range scale texture that is generally used. In some embodiments, the exemplary systems use the broadband iris texture as a second modality to reinforce the biometric analysis based on the short-range iris texture if the analysis based on the short-range iris texture is at a low-confidence level. In some embodiments, the biometric analysis of the short-range iris texture can be performed prior to the biometric analysis of the broadband iris texture. In some embodiments, the biometric analysis of the short-range and broadband iris texture can be performed substantially simultaneously.

In general, iris texture analysis for iris recognition follows the seminal work of Daugman, which demonstrates that Gabor wavelets of properly chosen length scale can encode the texture of an iris that is unique among virtually all other irises. See, e.g., J. Daugman, "High Confidence Visual Recognition of Persons by A Test of Statistical Independence", *IEEE Trans. Pattern Anal. Machine Intelligence*, vol. 15, No. 11, pp. 1148-1161 (1993). The length scale of Daugman's Gabor wavelet-based system is short, thereby avoiding problems associated with shading due to illumination and other longer length scale phenomena. Problems can occur, however, in cases of low-confidence matches, e.g., matches between a probe iris introduced to a system and enrolled irises in the system database that match with a score close to the worst acceptable matching threshold. In such instances, the biometric analysis system determines whether to accept such low-confidence match as a true positive and, if wrong, cause a false positive match, or reject the match as a false negative and, if wrong, cause a false negative match.

The exemplary system introduces new evidence in the form of a second modality that can be brought to bear on the question of whether a match exists in low-confidence matching cases. It should be understood that the exemplary system can use the second modality in non-low-confidence matching cases to reinforce the match determination by the system. The second modality of the exemplary system can be in the form of coarse or broadband iris texture that is determined using machine learning, machine vision and/or other signal processing or computer vision techniques. In the case of a low-confidence match, the broadband iris texture match determination can be used to weigh the match determination of the system. The fusion of both short and broadband iris texture analysis improves the overall accuracy of the biometric authentication process.

For example, the broadband iris texture can add weight to the determination of "no match" if the broadband iris texture is determined to be different in the probe and enrolled iris pair in question. As a further example, the broadband iris texture can add weight to the determination of a "match" if the broadband texture of the probe and enrolled iris are determined to be sufficiently similar. The additional analysis and determination gleaned from the coarse or broadband iris texture is uncorrelated to the information used by traditional iris biometric matching systems and, as such, provides the advantage of reducing matching errors by adding information to the decision process. Particularly, rather than relying on only short-range iris texture that may be conducive to false positives and false negatives, the broadband iris texture provides a secondary means of reinforcing the match determination performed by the biometric analysis system. The broadband iris texture therefore adds information to the evaluation of a biometric match, acting as an additional biometric modality. In some embodiments, both the short-range and broadband iris texture can be captured by the system using the same input information, allowing for the exemplary system to operate efficiently and effectively. It should be understood that the weight given to the short and broadband features during the analysis based on respective match or non-match results can vary based on a fusion algorithm tuned to the input imagery. For example, Table 1 below provides various algorithmic decisions that can be performed by the exemplary system.

TABLE 1

Algorithmic Decisions By System Based On Match Status

|  | Short-Range | Broadband | Result |
| --- | --- | --- | --- |
| Example 1 | Low-Confidence Match | Non-Match | Non-Match |
| Example 2 | Low-Confidence Match | High-Confidence Match | Match |
| Example 3 | High-Confidence Match | Low-Confidence Match | Match |
| Example 4 | High-Confidence Match | High-Confidence Match | Match |

With reference to FIG. 1, a block diagram of an exemplary system 100 of enhancing biometric analysis matching (hereinafter "system 100") is provided. As will be discussed in greater detail below, the system 100 is configured to collect at least one probe image having both short-range and broadband iris textural information that is used to determine whether a biometric authentic match exists between the probe image(s) and enrollment image(s). Rather than relying solely on the short-range iris textural information for the authentication match determination, the system 100 relies on the broadband iris textural information as a supplemental authentication match determination that either reinforces the authentication match determination in high-confidence cases or acts as a final deciding factor in low-confidence cases. By implementing the broadband iris textural information as a supplemental factor in the authentication determination, the system 100 ensures higher confidence in true positive and true negative determinations, and a reduction in false positive and false negative determinations. In some embodiments, rather than being used in combination with the short-range iris textural information, the broadband iris textural information can be used in combination with any other biometric modality, e.g., facial structure recognition, fingerprint scanning, gait analysis, infrared palm scanning, voice detection, combinations thereof, or the like.

The system 100 includes at least one illumination source 102 and at least one camera 104. The illumination source 102 can be a near infrared light. The illumination source 102 is configured to illuminate one or both irises of the subject. In some embodiments, the illumination source 102 can be configured to illuminate at least one facial feature surrounding the irises. In some embodiments, a single illumination source 102 can be used to illuminate the iris. In some embodiment, multiple independently controlled illumination sources 102 can be used to selectively illuminate one or both irises of the subject. Such illumination can occur simultaneously, synchronously, in a pulsed manner, or the like.

The camera 104 is configured to capture at least one image of one or both irises of the subject. The images captured by the camera 104 can be in the form of enrollment images electronically transmitted to and stored in at least one database 106 as enrollment data 108. The enrollment data 108 can be collected during enrollment of the subject into the system 100. The images of the enrollment data 108 include information or data corresponding to both short-range iris texture 110 (e.g., fine iris texture) and broadband iris texture 112 (e.g., coarse iris texture) to be used during the authentication process. It should be understood that the enrollment data 108 can be collected over a period of time by at least one camera 104 such that the authentication process of the system 100 considers images captured during different lighting or environmental conditions, as well as biometric changes associated with the subject over time.

The images captured by the camera 104 can be in the form of probe images 114 electronically transmitted to and stored in the database 106. The probe images 114 include information or data corresponding to both short-range iris texture 116 and broadband iris texture 118. During the authentication process, capture of the at least one probe image 114 results in capture of iris biometric data (both short and broadband) associated with the iris of the subject. In some embodiments, capture of the short and broadband iris texture 116, 118 can be accomplished in the same step or image, such that additional operation of the system 100 is not needed. For example, the data found in capturing a probe image 114 that includes short-range iris features can also be used to extract the data needed for constructing a broadband iris feature vector. In some embodiments, capture of the short and broadband iris texture 116, 118 can be accomplished in two or more consecutive steps.

The system 100 can include a communication interface 120 configured to provide for a communication network between components of the system 100, thereby allowing data to be electronically transmitted and/or received by the components of the system 100. The system 100 can include at least one processing device 122 with a processor 124 for receiving and processing the data captured by the camera 104. In some embodiments, the processing device 122 can receive the data captured by the camera 104 and electronically transmits such captured data to a central computing system 126 for analysis and processing. The processing device 122 can be in communication with and programmed to control operation of the camera 104 and illumination source 102. The processing device 122 receives as input camera imagery (e.g., probe images 114), analyzes the camera imagery, and contributes to the determination of whether a positive or negative match occurs.

The processing device 122 can receive as input the probe image 114 including both the short-range iris texture 116 and broadband iris texture 118. In some embodiments, the short and broadband iris texture 116, 118 can be input as a single image 114. In some embodiments, the short and broadband iris texture 116, 118 can be input as separate, individual images 114. The processing device 122 can analyze the short-range iris texture 116 of the probe image 114 relative to the short-range iris texture 110 of the enrollment data 108 to determine iris biometric authenticity for the short-range.

The processing device 122 can further analyze the broadband iris texture 118 of the probe image 114 relative to the broadband iris texture 112 of the enrollment data 108 to determine iris biometric authenticity for the broadband. Based on the biometric authenticity of the short and broadband iris texture 116, 118, the processing device 122 is capable of determining the biometric authenticity of the subject. For example, the processing device 122 can analyze the short and broadband iris texture 116, 118 in the probe image 114 relative to the short and broadband iris texture 110, 112 of the enrollment data 108 to determine whether a biometric match is found. The broadband iris texture 112, 118 analysis acts as a secondary modality to reinforce the findings of the short-range iris texture 110, 116 analysis. For example, if the short-range iris texture 110, 116 analysis results in a low-confidence positive match, a positive match of the broadband iris texture 112, 118 analysis can reinforce the short-range positive match. As a further example, if the short-range iris texture 110, 116 analysis results in a long-confidence positive match, a negative match of the broadband iris texture 112, 118 analysis can output an overall negative match. In some embodiments, the authentication analysis based on the broadband iris texture 118 can be used as a final deciding factor in confirming whether the authentication analysis based on the short-range iris texture 116 resulted in the correct determination. In some embodiments, authentication matching can be performed between the probe image 114 and an N-membered enrollment database (e.g., the enrollment data 108). In some embodiments, authentication matching can be performed between the probe image 114 and a single enrolled iris in the enrollment data 108.

The system 100 includes a user interface 130. In some embodiments, the user interface 130 can include a display in the form of a graphical user interface (GUI) 132. In some embodiments, the interface 130 can include a numerical (or alphanumerical display), the illumination source 102, the camera 104, combinations thereof, or the like. For example, instructions for properly using the system 100 can be provided to the user via the GUI 132. The GUI 132 can include at least one display or indicator for communicating information to the subject, such as the results of the authentication process.

Although discussed herein as authentication based on a single iris, it should be understood that in some embodiments, the system 100 can perform the authentication analysis on both irises of the subject. For example, rather than authenticating the subject based on biometric matching of a single iris (e.g., a left iris), both left and right irises of the subject can be analyzed relative to the corresponding left and right iris enrollment data. Data associated with results of authentication can be electronically stored in the database 106 as authentication data 128. In some embodiments, the authentication data 128 can be used to improve operation of the system 100 through, e.g., machine learning, machine vision, or the like. For example, after iterations of the authentication process, the authentication data 128 can be analyzed for false positives and false negatives to determine which features of the system (if any) can be varied to reduce the chance of false positives and false negatives.

As an example, the system 100 can initially perform the authentication analysis based on the short-range iris texture 116, 110 of the probe image 114 and enrollment data 108 to determine if a biometric authenticity match is found based on the short-range iris features. In some cases, short-range iris texture authentication on its own can be difficult and error prone. The system 100 can generate a score corresponding with the degree to which a biometric match was found based on the short-range iris features. If the result of the short-range authentication process produces a low-confidence match, e.g., a match with a score close to the worst acceptable matching threshold, the system 100 can perform the authentication analysis based on the broadband iris texture 118, 112 of the probe image 114 and enrollment data 108 to determine if a biometric authenticity match is found based on the broadband iris features. In some embodiments, the short and broadband authentication analysis can be performed substantially at the same time.

If the result of the broadband authentication process produces a high-confidence positive match and the short-range authentication process produced a low-confidence positive match, the broadband authentication result can be used to confirm that a positive biometric match occurred. If the result of the broadband authentication process and the result of the short-range authentication process both produces a low confidence positive match, the broadband authentication result can be used to confirm that a negative biometric match occurred.

Similarly, if the result of the broadband authentication process produces a high-confidence negative match and the short-range authentication process produced a low-confidence negative match, the broadband authentication result can be used to confirm that a negative biometric match occurred. If the result of the broadband authentication process and the result of the short-range authentication process both produces a low confidence negative match, the broadband authentication result can be used to confirm that a negative biometric match occurred. In instances of a negative biometric match confirmation, the system 100 can request an additional probe image 114 from the subject.

Broadband features in the texture of an iris of the probe image 114 can focus on general features of the iris, as compared to features just found only in the short-range analysis, and can be determined using any number of schemes including but not limited to signal processing, computer vision methods, deep learning, machine learning, machine vision, or the like. In the case of machine learning, the system 100 can train on a variety of irises to capture and produce broadband iris features, and such broadband iris features learned by a network can be used to characterize an iris. In the case of signal processing or computer vision, the system 100 can use an algorithm for computational vision methods with a filter to detect and select radial transitions between a region of an iris with a broadband feature (e.g., a collarette) and a region beyond the broadband feature.

In some embodiments, the broadband feature analysis can determine the degree to which the features in the probe image 114 are present, and the coarsely defined region where the feature is found, e.g., in one of two annular rings, inner half of the iris, or outer half of the iris. For example, the system 100 can determine the presence of horizontal or vertical stripes in the inner half of the iris closest to the pupil. The number of broadband iris features found in the texture of a probe iris can be combined (by the processing device 122) into a feature vector. In some embodiments, the feature vector can include a listing of features and their measured strength. It should be understood that the feature vector can be representative of one or more broadband features of an iris, with each component of the feature vector being associated with a respective broadband feature and the magnitude of the component value representing the strength or intensity of the broadband feature.

During the authentication analysis for the broadband iris texture, the measured feature vector of the probe iris of the probe image 114 can be analyzed and compared to the feature vector of an enrolled iris of the enrollment data 108 that is suspected of matching the probe iris, but with a match score indicative of a low confidence match. Particularly, the system 100 can initially analyze and compare the short-range iris features of the probe image 114 and the enrollment data 108. Such short-range iris feature analysis can determine the enrollment image with the closest match to the probe iris, and the broadband feature vector can be compared to the same enrollment image to supplement the short-range feature determination.

As an example, N can represent the number of coarse or broadband features found in the iris ($F_1$, $F_2$, $F_N$), such as crypts, sunbursts, flames, or the like. A feature vector can include N features listing the amount or proportion of each of the N features found to be present in the iris texture in question. In some embodiments, the amount or proportion of each broadband feature can be represented as a numerical value between 0 and 1, with 0 indicating a complete absence of the broadband feature and 1 indicating the highest level of detection or presence of the broadband feature. In some embodiments, different numerical value ranges can be used to represent the magnitude of presence of each broadband iris feature. For example, if N=3 for three broadband features being analyzed, the feature vector of a first iris can be represented as (0, 1, 0). Such feature vector can indicate that feature $F_2$ is present while features $F_1$ and $F_3$ are absent. A second iris with a feature vector of (0.1, 0.8, 0.1) may be considered a match to the first iris vector of (0, 1, 0) due to the smaller $F_1$ and $F_3$ values and close relationship of the $F_2$ values. Particularly, a match can be found based on the similarity in the texture of the probe and enrollment irises.

However, a third iris with a feature vector of (0.4, 0, 0.6) may be considered a non-match to the first iris vector of (0, 1, 0) due to the difference in values for the $F_1$ and $F_3$ features and the non-existent $F_2$ feature. In some embodiments, the determination of match or non-match can be based on whether the magnitude of the feature is within a predetermined threshold range (e.g., within ±0.2). In some embodiments, comparison of two feature vectors to determine the degree to which broadband characteristics indicate a match can use a variety of methods including but not limited to binary comparison of at least one feature, Euclidean distance, non-Euclidean distance, a dot product analysis, a weighted dot product analysis, weighted distance measurement, mathematical comparison of two feature vectors relative to a threshold, or the like.

In some embodiments, the broadband iris features discussed herein can include the measurement of the presence of crypts in an iris as a particular broadband feature. In some embodiments, measurement of the presence of crypts can be performed without considering the exact position, size or relative orientation of the crypts. For example, rather than analyzing the probe and enrollment images for a specific quadrant or radial position of a broadband feature, the system can analyze the images to determine if the broadband feature is detected in any location of the iris. By analyzing the images without considering the exact position, size or relative orientation of the broadband feature, the system is capable of detecting potential matches even if the orientation of the captured iris is different from the orientation of the enrollment images. If measurement of a second iris shows no crypts or a low level of crypts in position $F_1$ of the feature vector, such determination can indicate a non-match that outweighs the low-confidence authentication result based on the short-range iris features. In some embodiments, the system 100 can consider the exact position, size and/or relative orientation of the crypts. For example, the system 100 can determine that the crypts are present only in the inner portion of the iris nearest the pupil in the enrollment image, while in a second iris (e.g., the probe image 114), similar crypts are found only in the other portion of the iris near the sclera. Based on such determination, the system 100 can indicate that the two irises do not match.

In some embodiments, the focus of a broadband iris texture feature analysis can be on detecting the existence of—or nature and/or quality of—the features, rather than focusing simply on exact position and/or shape of a broadband iris feature. However, some embodiments of such analysis can so focus on position and/or shape, depending on the nature of the feature vector. Broadband iris features can form either a ring of features surrounding the pupil (e.g., crypts) or features that loosely encircle the iris (e.g., nodules). As an example, if the probe image of the iris includes a ring of crypts, the system 100 can be configured to analyze the enrollment image to determine the existence of a ring of crypts in the enrollment image. If the system 100 determines that a ring of crypts exists in the enrollment image, whether of the same or different diameter and/or configuration as the crypts in the probe image, the system 100 can output at least a low-confidence match.

Example Feature Vector

By way of non-limiting example, an example feature vector ($F_1, F_2, F_3, F_4, \ldots$) is herein described whereby the feature vector is formed of set member(s) comprising background texture as feature 1 ($F_1$), collaret as feature 2 ($F_2$), crypts ($F_3$), and Wolfflin nodules ($F_4$), with the following being assigned to the following:

($F_1$) Background Texture:
0=Blank;
1=Non-descript;
2=Thin Radial Lines (thin being low-radian line width); and
3=Fat Radial Lines (fat being high-radian line width.
($F_2$) Collaret:
0=None;
1=Barely Discernable;
2=Visible; and
3=Pronounced.
($F_3$) Crypts (such as openings, holes):
0=None;
1=within <¼ r;
2=within <½ r; and
3=≥½ r;
where r is the distance from the pupil-sclera boundary to the outer perimeter of the scilera (near the skin), and where a lower number is closer to said boundary and where a higher number is closer to said outer perimeter, such that F is a measure of the amount of territory that is occupied with crypts (e.g., 1 would be just a thin inner ring of crypts, where 3 would be a fatter ring of crypts that occupy more area of the sclera extending out from the pupil).
($F_4$) Wolfflin Nodules (such as dotted rings of pigmentation in the sclera circling the pupil or other patterns):
0=None;
1=dotted pigmentation forming non-ring-like pattern;
2=dotted pigmentation forming a partial ring pattern;
3=dotted pigmentation forming a ring pattern; and
4=dotted pigmentation forming a double-ring pattern.

In the present feature vector example, $F_4$ (Wolfflin Nodules) has been assigned a scale of zero to four, whereas the example assigned scale for each of $F_1$, $F_2$, and $F_3$ of zero to three. This is to show that the assigned scale for each feature of the feature vector need not include the same number of selections.

With respect to the above example feature vector and/or otherwise speaking, a good matching score can be indicative of a match of high confidence, a low matching score can be indicative of a non-match, and a gray region can be indicative of an instance in which a match may indicate a true positive but with lower confidence than is desired. Although the broadband feature analysis of the system 100 can be used in any of the good, low and gray instances, such operation can be particularly valuable in cases of matches in the gray region.

If the system 100 determines that the feature vector of the probe image 114 and the feature vector of the enrolled iris meet or exceed a predetermined level, referred to herein as a threshold, the broadband iris feature determination can add confidence and indicates a true positive match output. If the broadband iris features of the probe image 114 and of the enrolled iris do not meet the predetermined threshold, the low-confidence match can be demoted to a non-match output. The broadband iris feature analysis therefore provides a second biometric modality to add confidence to a biometric match based on short-range iris features. For example, the broadband iris texture analysis can act as a supplemental factor for resolving ambiguity in the case of a low-confidence (or any confidence level) matching score.

The iris matching algorithms of the system 100 can therefore be used to minimize false positive and false negative errors. Such errors can be minimized in biometric authentication systems that rely on short-range iris feature analysis, or can be used in combination with any other biometric authentication features. For example, the broadband iris feature analysis can be used to disambiguate low-confidence matches in traditional biometric analysis systems.

In some embodiments, the system 100 can be used to authenticate the subject based on analysis of a single iris. In some embodiments, the system 100 can be used to authenticate the subject based on analysis of both the left and right irises. In such embodiments, at least one camera 104 can produce probe images 114 of both the left and right irises of the subject, and the system 100 analyzes the probe images 114 relative to respective left and right iris enrollment images of the subject. In some embodiments, the analysis of the probe images 114 can be performed in a pair (e.g., both the left and right irises can be grouped together and simultaneously matched to respective left and right enrollment irises), or independently (e.g., the left iris probe is matched to left iris enrollment images independently from the right iris probe being matched to right iris enrollment images). If two low-confidence matches are found, the system 100 can fuse these results to increase the level of confidence of a match. For example, if both the left and right enrolled irises that match with low confidence come from the same enrolled subject, the confidence of the match can be enhanced. The broadband iris feature analysis of the system 100 can further be used to ensure that the coarse feature spectrum of the matching iris also matches the other iris, e.g., that the left and right irises share a threshold level of coarse features.

In some embodiments, the broadband iris feature analysis of the system 100 can be used as a stand-alone iris biometric modality in cases of degraded iris images (e.g., out of focus images, images having a low spatial resolution due to low sampling density, or the like). In such embodiments, the broadband texture of the iris can be used as a soft biometric in combination with, e.g., face biometrics, fingerprint analysis, voice recognition, gait analysis, or the like, to produce a reliable biometric indicator.

In some embodiments, the system 100 can be used to curate iris databases in search of clerical errors. Such errors can limit the ultimate accuracy of any biometric matching system. Because there is generally a correlation of the broadband feature vectors between a given subject's left and right iris, testing a database in search of cases that show vastly different left and right iris feature vectors can signal potential database errors. The broadband feature vectors can therefore also be used to ensure accurate iris database maintenance, and can operate alongside de-duplication in database checking operations.

The irises of identical twins generally do not match. Traditional Daugman-type iris matching methods show that on a fine scale, the irises of identical twins are as similar as irises of unrelated subjects. The Daugman-type methods also register no match between the left and right iris of the same person which, genetically speaking, are even closer to one another. However, as shown in FIGS. 2A-H, the broadband or coarse similarities of left and right irises of given subjects are unmistakable. Particularly, the left and right iris pairs of FIGS. 2A-B, FIGS. 2C-D, FIGS. 2E-F, and FIGS. 2G-H show distinct similarities in the broadband features. Thus, even if the left and right iris pairs have different short-range features, the left and right iris pairs of the same subject share substantially similar broadband features. See, e.g., K. Hollingsworth et al., "Similarity of iris texture between identical twins," 2010 IEEE Computer Society Conference on Computer Vision and Pattern Recognition—Workshops, 13-18 Jun. 2010, pp. 22-29 (2010).

Experimentation was performed to determine the effectiveness of broadband or coarse iris textures for iris matching. A collection of left and right NIR irises images of sixteen individuals, chosen at random, was constructed from a larger database. A preliminary experiment used irises of half of the selected subjects. In the preliminary experiment, the sixteen irises of eight subjects were laser printed on copy paper. The irises were cut from the larger eye image to eliminate the sclera and any evidence of eyelids or eyelashes. The irises were then attached to a single sheet of paper in a random order with random rotational orientation and each iris was labeled with a letter from A to P. Participants in the experiment were instructed to seek and record the letter identifiers of left-right iris pairs. Each of the participants succeeded in matching all of the left-right pairs correctly using the coarse iris texture as the primary cues for matching. It was noted that the iris gray-shade, position of specular reflections, shape of the irises after eyelid removal, and overall iris size provided secondary cues for matching.

Irises for the subsequent experiment were extracted from the second set of sixteen irises. Two random irises, ringers from each of two subjects of the first set, were added to create a set of eighteen irises. The gray-shade of each iris was shifted slightly and at random. Instead of using the precise iris-sclera boundary along which to cut, a near-circular boundary was produced that avoided eyelids and eyelashes and gave no cues about eye orientation. Isolated irises were rotated and slightly resized at random and arranged at random on a single page with specular reflections painted black. The left and right irises for the experiment are shown in FIGS. 3A-R. The correct pairings are indicated by the matching numbers within each iris, e.g., 1 with 1, 2 with 2, etc., with "x" representing the two random irises. The irises were distributed electronically to eliminate the role of printer artifacts. Participants of the experiment were able to identify four of the eight pairs of subjects (1, 2, 3 and 6) correctly and often confused one of the random irises (FIG. 3E) with the correct pairing of subject 4 (FIGS. 3D-F). The remaining three pairs (5, 7 and 8) proved more difficult and were identified correctly by about half of the participants. The results of the experiments indicated that the apparent similarities between the NIR images of left and right irises of a given subject derive from broadband, human-readable iris texture that is on a scale outside of the Daugman algorithm filter window, but well within a human usable scale. The experiment also emphasized that the broadband iris texture can be used to reinforce traditional biometric matching operation. The experiment further emphasized that the broadband iris texture can be used to perform an initial biometric analysis for optimizing reordering of the enrollment data in a biometric analysis system (e.g., system 200 discussed below) prior to authentication performed based on the short-range iris texture.

Figure 4:
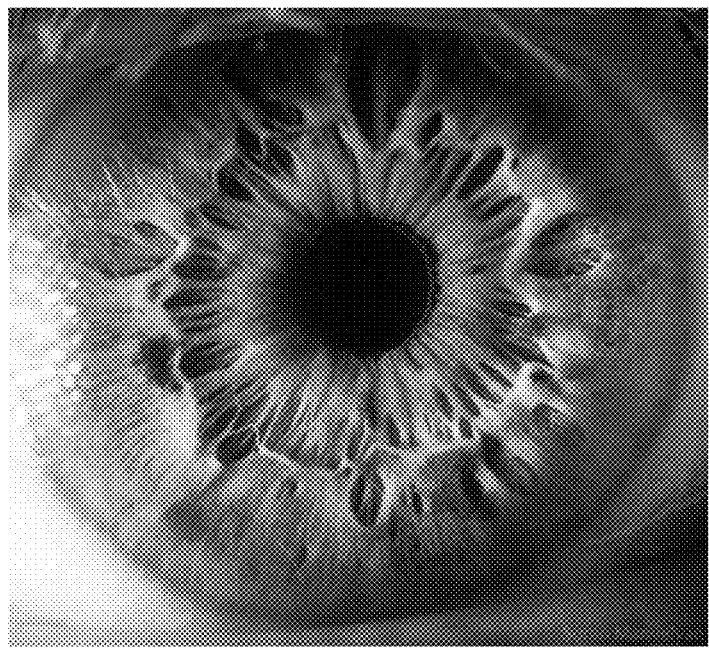
FIG. 4 is a red, green and blue (RGB) iris image showing elongated holes in the iris surface referred to as crypts.
Figure 5:
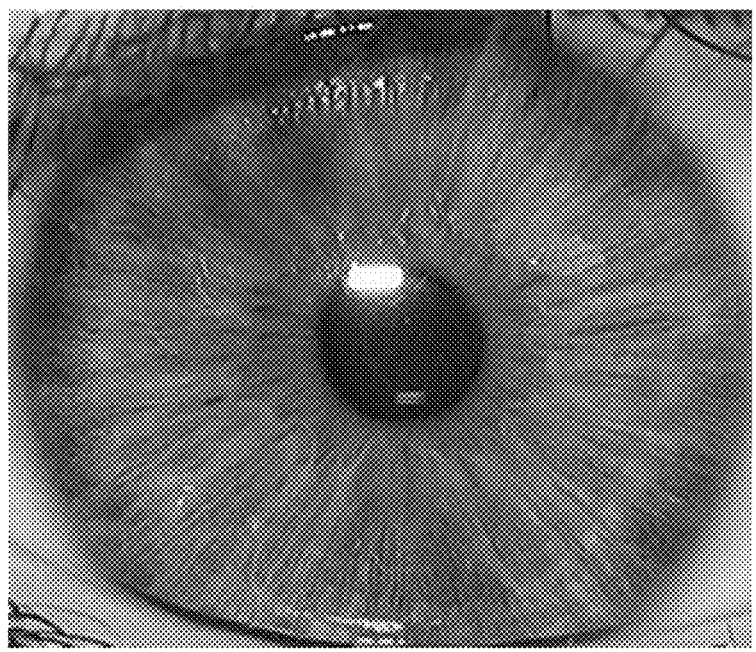
FIG. 5 is an RGB iris image showing no obvious crypts.

Additional experiments were performed in training a deep learning network for matching irises based on broadband iris features. The AlexNet network through MATLAB's neural network toolbox was implemented. See, e.g., Krizhevsky, A. et al., "ImageNet Classification with Deep Convolutional Neural Networks", NIPS 2012: Neural Information Processing Systems, Lake Tahoe, Nev. (2012). The AlexNet network includes a series of five convolutional layers (plus a combination of ReLu, normalization and pooling layers) and two fully connected layers, ending with a softmax layer for classification. The network had previously been trained using a large number of 227×227 RGB images from a large number of classes. The network was retrained by changing two of the last layers. The last fully connected layer included only two neurons and the final layer classified the presence or absence of a particular iris feature known to ophthalmologists. It should be understood that the number of features used can be expanded to more comprehensively characterize features of irises. The particular feature fixated on for experimentation is referred to as a crypt (e.g., a Fuchs' Crypt). Presence of crypts has been shown to correlate to genetic markers that in turn correlate to particular demographic populations. See, e.g., M. Edwards et al., "Analysis of iris surface features in populations of diverse ancestry," Royal Soc. Open Sci., vol. 3:1 (January, 2016) (published on-line). FIG. 4 shows an RGB image of an iris with such crypts visible as elongated holes in the iris surface, while FIG. 5 shows an RGB iris image without obvious crypts.

Figure 6:
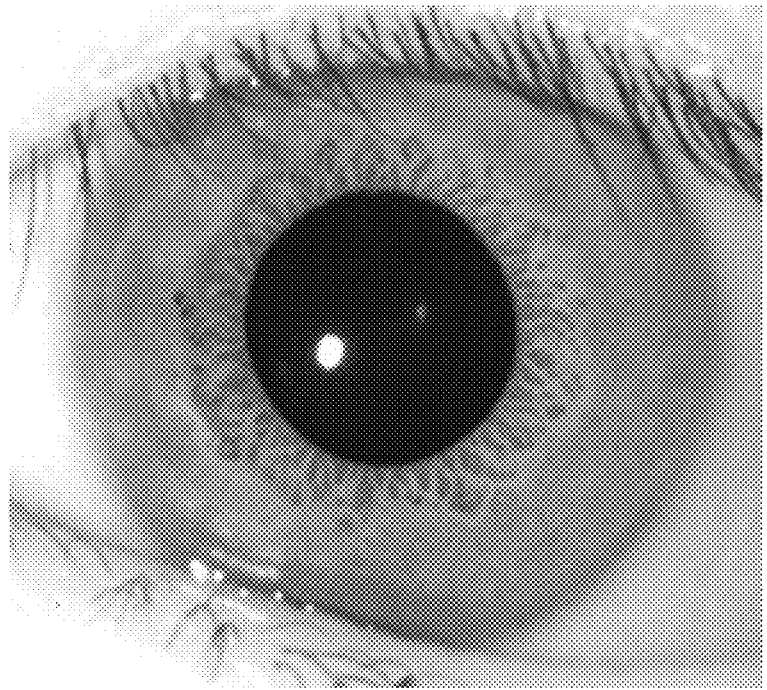
FIG. 6 is an image of an NIR illuminated iris showing elongated holes (crypts) in the surface near the pupil.
Figure 7:
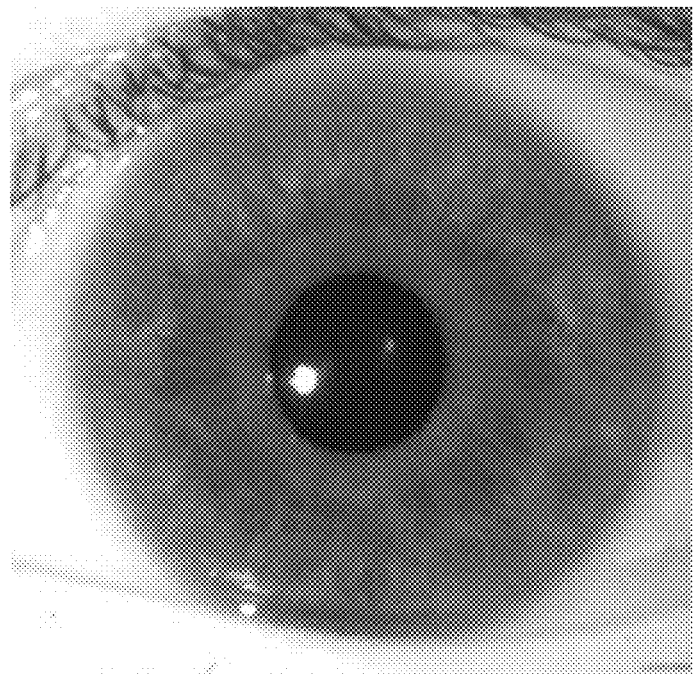
FIG. 7 is an image of an NIR illuminated iris showing no evidence of the crypts.

In the NIR spectrum with direct frontal illumination that creates less shadowing, crypts (e.g., Fuchs' Crypts) of different eyes can be seen in FIG. 6 and not in FIG. 7. Contrast in the NIR images of FIGS. 6 and 7 is not as dramatic as illustrated in the visible light illuminated images of FIGS. 4 and 5. As an initial experiment to characterize irises using machine learning, irises were categorized as either having crypts or not. The following procedure was used to produce the "Crypts" and "NoCrypts" datasets.

Figure 8A:
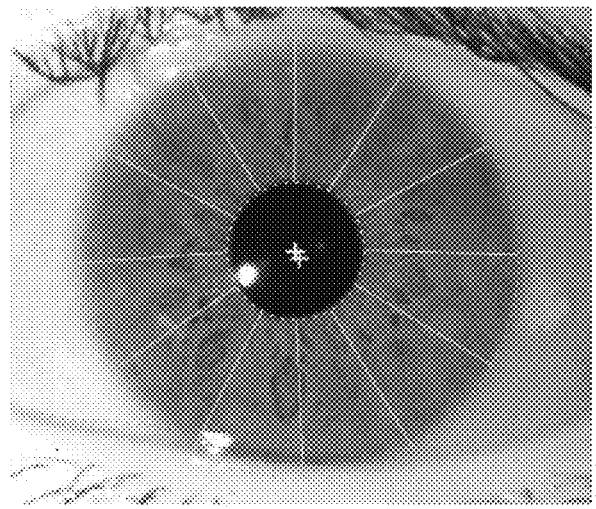
FIG. 8A is an image of an original iris showing 12 of 360 radial spokes along which iris texture was sampled.
Figure 8B:
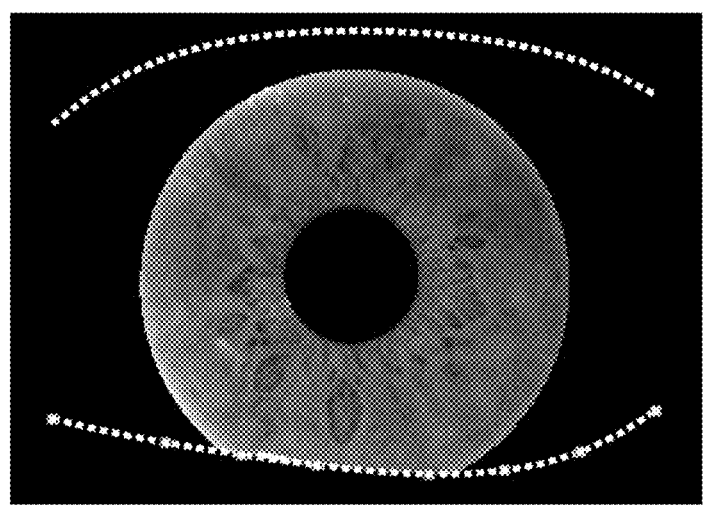
FIG. 8B is an image of an iris showing dashed eyelid masking lines.

During a first conversion step shown in FIGS. 8A-B, the original 640×480 8-bit iris images were converted to Kind 7 masked irises. See, e.g., P. Grother et al., "IREX I, Performance of Iris Recognition Algorithms on Standard Images," NIST Interagency Report 7629, p. 2 (September 2009). During a second conversion step shown in FIG. 8C, the Kind 7 masked irises were sampled on 101 evenly spaced points along each of the 360 radial spokes from the pupil-iris boundary to the iris-sclera boundary including the masked eyelid area. The polar sampling was plotted as a normalized rectangle similar to that used in iris recognition algorithms.

Figure 8C:
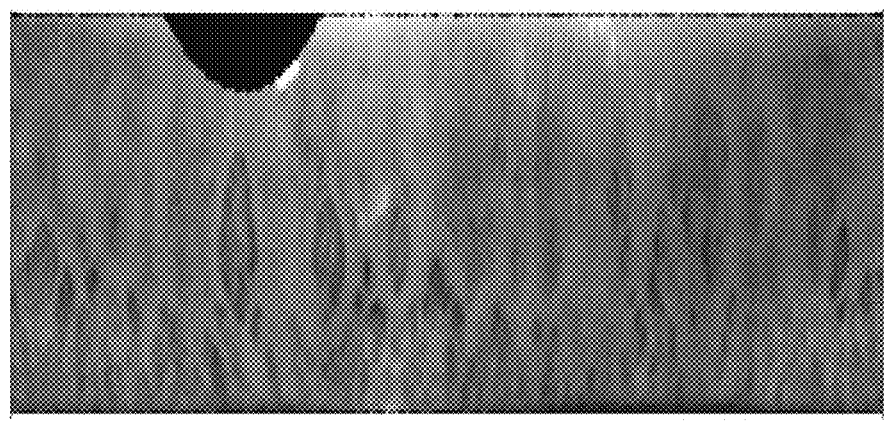
FIG. 8C is a 101×361 pixel polar representation showing the masked region.
Figure 9D:
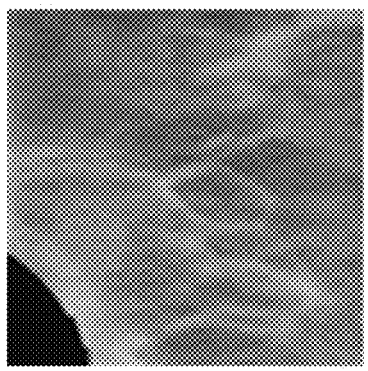
FIGS. 9A-H are images of 90×90 pixel "chunks" of iris texture extracted from polar iris representations showing the presence of crypts (FIGS. 9A-D) and the absence of crypts (FIGS. 9E-H).
Figure 9H:
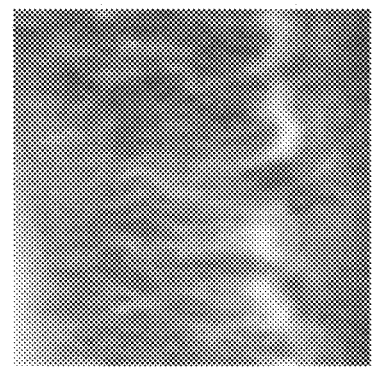
Figure 9C:
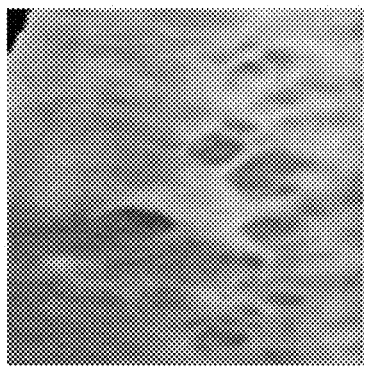
Figure 9G:
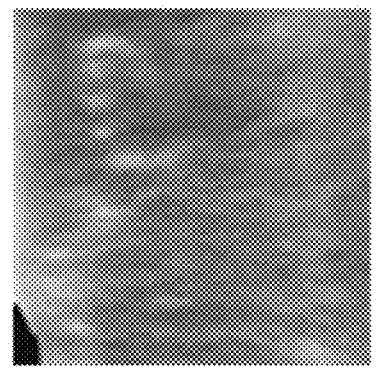
Figure 9B:
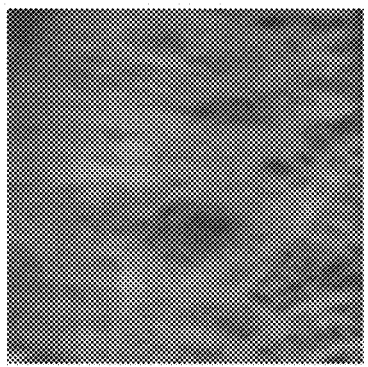
Figure 9F:
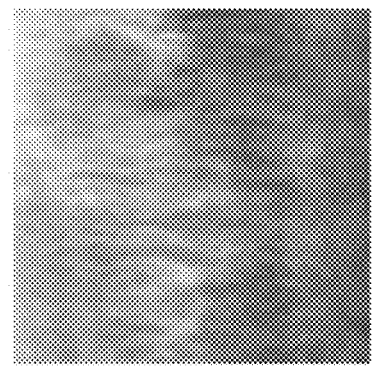
Figure 9A:
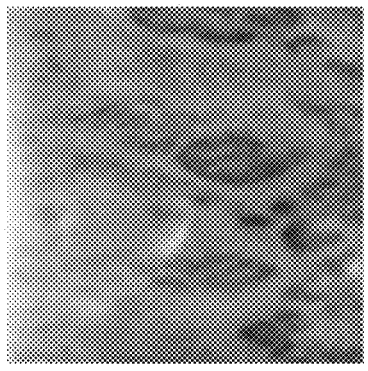
Figure 9E:
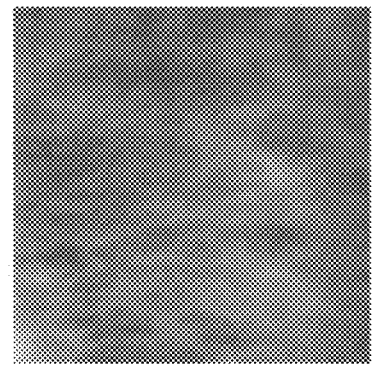
Figure 10A:
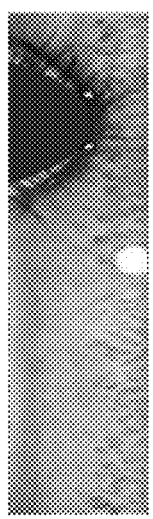
FIGS. 10A-F are randomly chosen CASIA-Lamp irises in polar representation showing crypts, particularly near the pupil boundary.
Figure 10B:
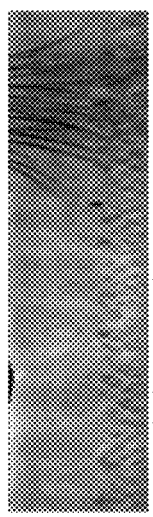
Figure 10C:
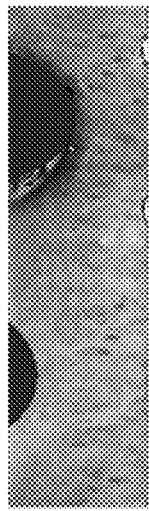
Figure 10D:
Figure 10E:
Figure 10F:

During a third conversion step shown in FIGS. 9A-H, 90×90 pixel chunks of the iris were sampled from polar iris representations of similar to FIG. 8C, aiming to cover as much of the iris texture as possible while limiting the masked area to less than 5% of the total area of any chunk. FIGS. 9A-D show the presence of crypts, while FIGS. 9E-H show an absence of crypts. Dark or black regions of FIGS. 9C, D and G represent eyelid masks, while light or white regions of FIG. 9H represent Wolflin nodules, e.g., textural features that can be learned but are were not relied on in the experimentation. The individual chunks of FIGS. 9A-H were labeled on the basis of whether crypts were present or not, resulting in two labeled populations.

Irises for the experiment came from forty-nine-subjects in the form of 640×480 8-bit NIR iris images of the standard type. Three transactions for each subject provided a total of 290 irises. Of these, 262 segmented successfully and were transformed to polar representations. From the polar representations, 616 90×90 pixel chunks as shown in FIGS. 9A-H were generated, 251 of which were labeled as including crypts and the remaining 365 were labeled as no crypts. These two groups of iris texture patches formed the input to the machine learning exercise.

Particularly, the two groups of iris texture patches formed the input for the AlexNet deep learning network and the network was modified to learn two classes of iris texture patches (with and without crypts). Training data representing 80% of the total of each class was chosen at random from the two groups of iris texture patches. Training used MATLAB's forward and reverse propagating limited memory Broyden-Fletcher-Goldfarb-Shanno (LBFGS) algorithm to minimize loss in fidelity as the images were propagated back and forth through the multiple layers of neurons.

After twenty passes through the full data set (20 epochs), the loss in fidelity stabilized at an asymptotic limit while the training data accuracy peaked at close to 100%. Training data accuracy is not a true measure of the predictive ability of a trained network. Generally, training data based on a learning group is used to train a neural network, and the effectiveness of the trainer network is tested on a dataset from a testing group previously unseen by the neural network. Testing with the remaining 20% of the data (123 iris texture patches, 50 Crypts, and the rest NoCrypts) showed between 90 and 92% accuracy with repeated trials using randomly chosen test data. Interpreted in terms of error rate, the result shows that of every 100 iris texture patches examined by the deep learning network, 8 to 10 errors are expected in which either an iris texture patch with crypts is predicted to have none or an iris texture patch without crypts is predicted to have some. When examined, the error cases listed in Table 2 for one sample run invariably included ambiguous textures that proved difficult to manually classify. Thus, with supervised learning, the modified deep learning network AlexNet can successfully distinguish one particular textural feature of irises with about 90% accuracy.

TABLE 2

Confusion Matrix For Text of Modified AlexNet
On Iris Texture Patches With and Without Crypts

| | Predicted to Have Crypts | Predicted to Have No Crypts |
|---|---|---|
| Manually selected to have crypts | 45 | 5 |
| Manually selected to have no crypts | 5 | 68 |

The CASIA-Lamp (Chinese Academy of Sciences Institution of Automation Lamp) database includes twenty left and twenty right irises of 411 Chinese subjects, mostly university students. FIGS. 10A-F are randomly chosen CASIA-Lamp irises in polar representation showing crypts, particularly near the pupil boundary. Such crypts can be detected by the exemplary system during broadband iris feature analysis.

Figure 11A:
FIGS. 11A-C are NIR illuminated iris images showing Wolfflin nodules indicated by dotted white lines at a roughly constant radius about the iris center.
Figure 11B:
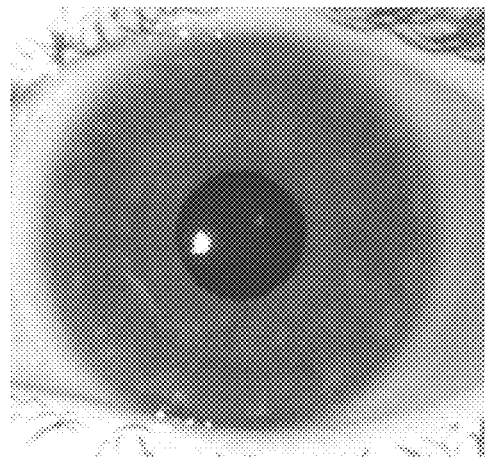
Figure 11C:
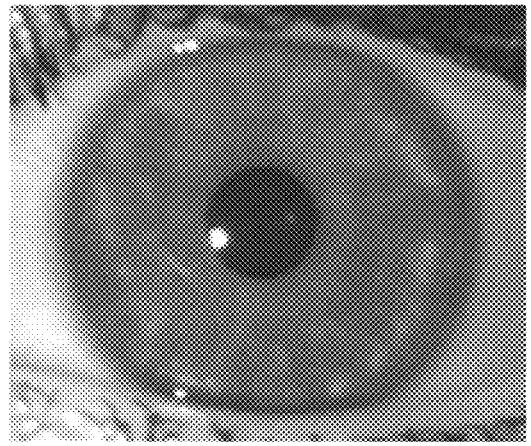

Another iris texture feature recognized by ophthalmologists and referred to as Wolflin nodules appear in NIR images as white blobs often located at constant radius positions forming circular arcs of dots relative to the iris center. FIGS. 11A-C are examples of NIR images showing irises with Wolfflin nodules. The exemplary system and network can be trained to identify Wolfflin nodules as one of the broadband iris features for identification.

The system can be trained to identify additional iris textural features, such as collarettes, radial spokes, looping (spirograph-like) light or dark lines, combinations thereof, or the like. Some of the features can be detected by searching for azimuthal angle-independent patterns. Some of the features can be detected by searching for particular spatial frequencies in the azimuthal direction or by more complex signal analysis on the irises in the polar representations.

Figure 12A:
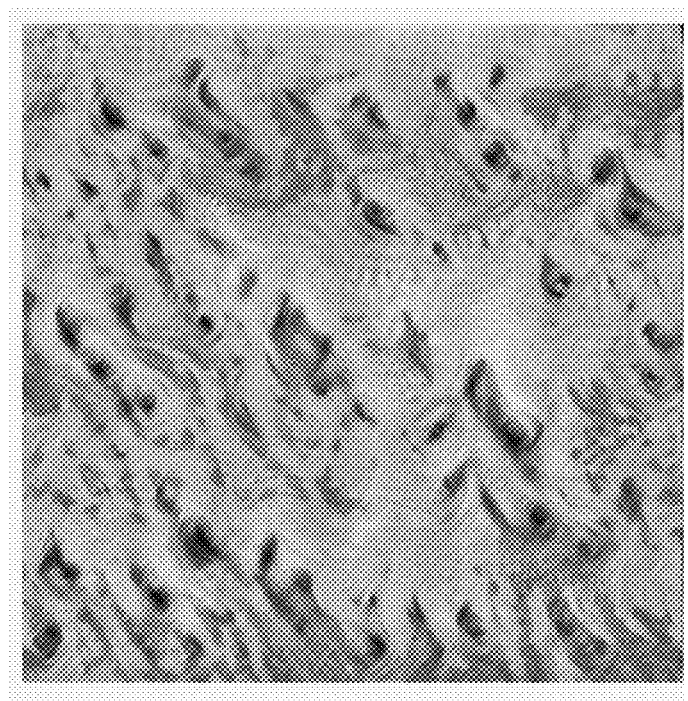
FIGS. 12A-B are representations from AlexNet's deep dreams of irises with crypts (FIG. 12A) and without crypts (FIG. 12B) representing input to the network that results in strong activation of either the crypt or no crypt output neurons.
Figure 12B:
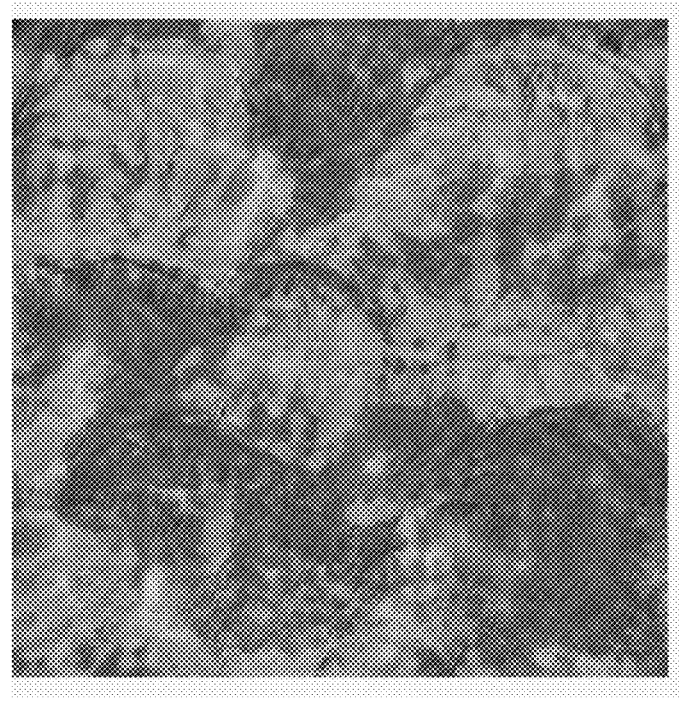

The system can also be trained to detect human non-readable features. Training a network on an ensemble of irises can automatically generate features. A deep learning network can develop its own features on increasing length scales as small filters in convolutional layers that find edges combined to find corners and further combined to form patterns of increasing complexity. The complex features of a deep learning network can be referred to as deep dreams in reference to the output of a reverse propagating signal that starts as input into a single output (classification) neuron. Textbook examples using networks trained to distinguish dogs, cats, frogs, trucks, cars, or the like, can generate deep dreams of any of the trained classes giving insight into what a network thinks when asked to find a particular object. In the case of the modified AlexNet that distinguishes irises with crypts and no crypts, deep dreams reveal stark differences between the categories as shown in FIGS. 12A-B. Distinct foci were observed in the deep dream of irises with crypts, but only broad textures were observed in deep dreams of irises without crypts. Each dream can represent a stimulus tuned to produce high activation in the neuron classifying a corresponding object.

Figure 13:
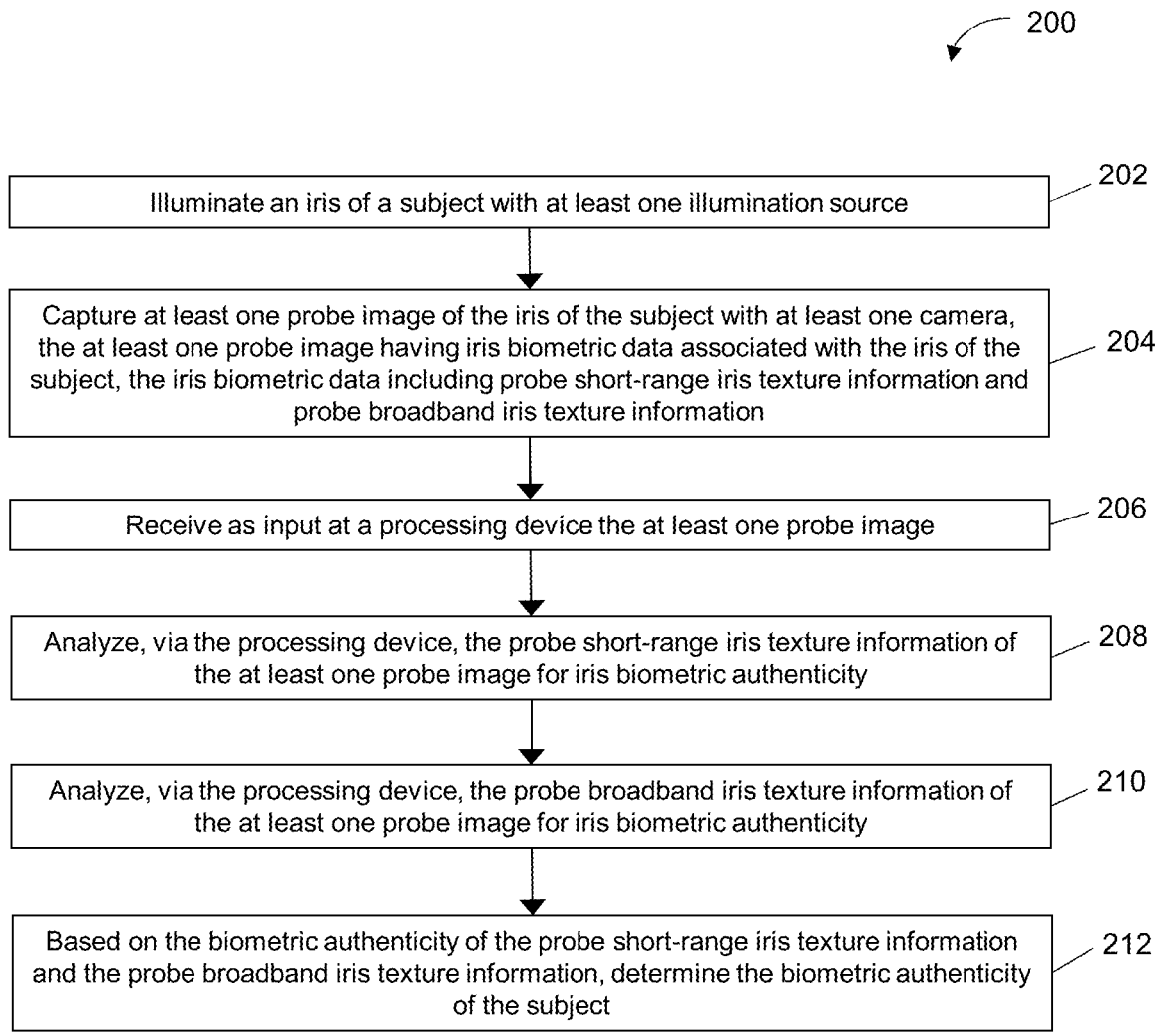
FIG. 13 is a flowchart illustrating an exemplary process of implementing a system of enhancing biometric analysis matching accuracy in accordance with the present disclosure.

FIG. 13 is a flowchart illustrating an exemplary process 200 of implementing the system 100. To begin, at step 202, the iris of the subject is illuminated with at least one illumination source. At step 204, at least one probe image of the iris of the subject can be captured with at least one camera. Each of the probe images has iris biometric data in the form of short and broadband iris texture information. At step 206, a processing device can receive as input the at least one probe image. At steps 208 and 210, the short and broadband iris texture information can be analyzed by the processing device for iris biometric authenticity. At step 212, based on the biometric authenticity of the short and broadband iris texture information, the processing device can determine the biometric authenticity of the subject.

In accordance with another embodiment of the present disclosure, exemplary systems of enhancing biometric analysis matching efficiency are provided that use a combination of short-range and broadband iris texture analysis to efficiently and accurately perform the authentication analysis. Traditionally, the time spent matching a probe iris template against an enrollment database increases with database size and can become burdensome with large databases. Brute force addition of parallel computing resources and more cores may reduce overall matching times, but generally involves an increase in costs for both the additional equipment and maintenance. However, in the present disclosure, by implementing both short-range and broadband iris texture analysis, exemplary systems disclosed herein provide an efficient analysis and search of an enrollment database during the authentication process, thereby reducing matching time per core and relieving the need for extra hardware, thereby preferably enhancing biometric matching efficiency. Particularly, rather than focusing on a random search for matches within the enrollment database, the exemplary systems reorder the enrollment database based on the broadband iris feature relevance of the enrolled irises. Such reordering allows for the biometric matching based on the short-range iris features to be performed starting with the most relevant enrolled irises, ensuring that a positive match can be found in a faster time period.

As noted above, traditional biometric analysis systems generally disregard broadband iris texture and instead focus on short-range iris texture evaluation. Biometric analysis based on the short-range iris features can be time-consuming and error prone due to the excessive size of the database storing enrollment images and due to the random nature of the matching process. For example, finding a match between a probe image and an enrollment image stored in a database having over one million enrollment images can result in a lengthy period of time. As a further example, if a digital iris code for the short-range iris features starts with the bits 10010001, there is no guarantee that an authentic match would share the same starting bits in its code. Because of the vagaries of iris encoding, the bits representing an iris are generally uncertain.

The exemplary system incorporates the broadband or coarse iris texture analysis as a means for providing a more efficient authentication process. As large biometric iris databases find increasing use in national identification programs, travel programs, or the like, the authentication process will necessitate larger searches. In public-facing applications, it is essential that the authentication and transaction time be minimized. The exemplary system ensures a time-efficient authentication process for enrollment databases of any size, reducing undesirable lag time and improving overall operation of the biometric analysis system.

During the enrollment process, the system can capture and electronically record both the short-range and broadband iris texture for a subject. During a subsequent authentication process, at least one probe image can be captured and the system can extract both the short-range and broadband iris texture from the probe images. Rather than searching for a match between only the short-range iris texture of the enrollment and probe images, the system implements the broadband iris texture to initially reorder the database of enrolled irises based on detected matches between the broadband iris texture features.

Particularly, the system can be configured to detect the closest matches of the probe broadband iris texture and the enrollment broadband iris texture, and generates a reordered form of the enrolled irises with the closest matches closer to the front or top of the database. Instead of a random or sequential matching between the probe and enrollment images, the exemplary system provides an optimized matching order for each probe iris that is determined by the coarse or broadband iris features in the probe image. In some embodiments, the coarse or broadband iris texture can be determined using machine learning, machine vision, and/or other signal processing or computer vision techniques. The optimized order of the enrollment data based on matching of the broadband iris features increases the likelihood that a match occurs early in the list during the subsequent short-range authentication analysis.

After the optimized matching order has been generated, the system can analyze the short-range iris texture of the probe image relative to the reordered enrollment images, starting with the closest broadband iris texture matches. Analyzing the short-range iris texture based on the reordered enrollment images ensures that a match can be found in a more efficient manner.

Figure 14:
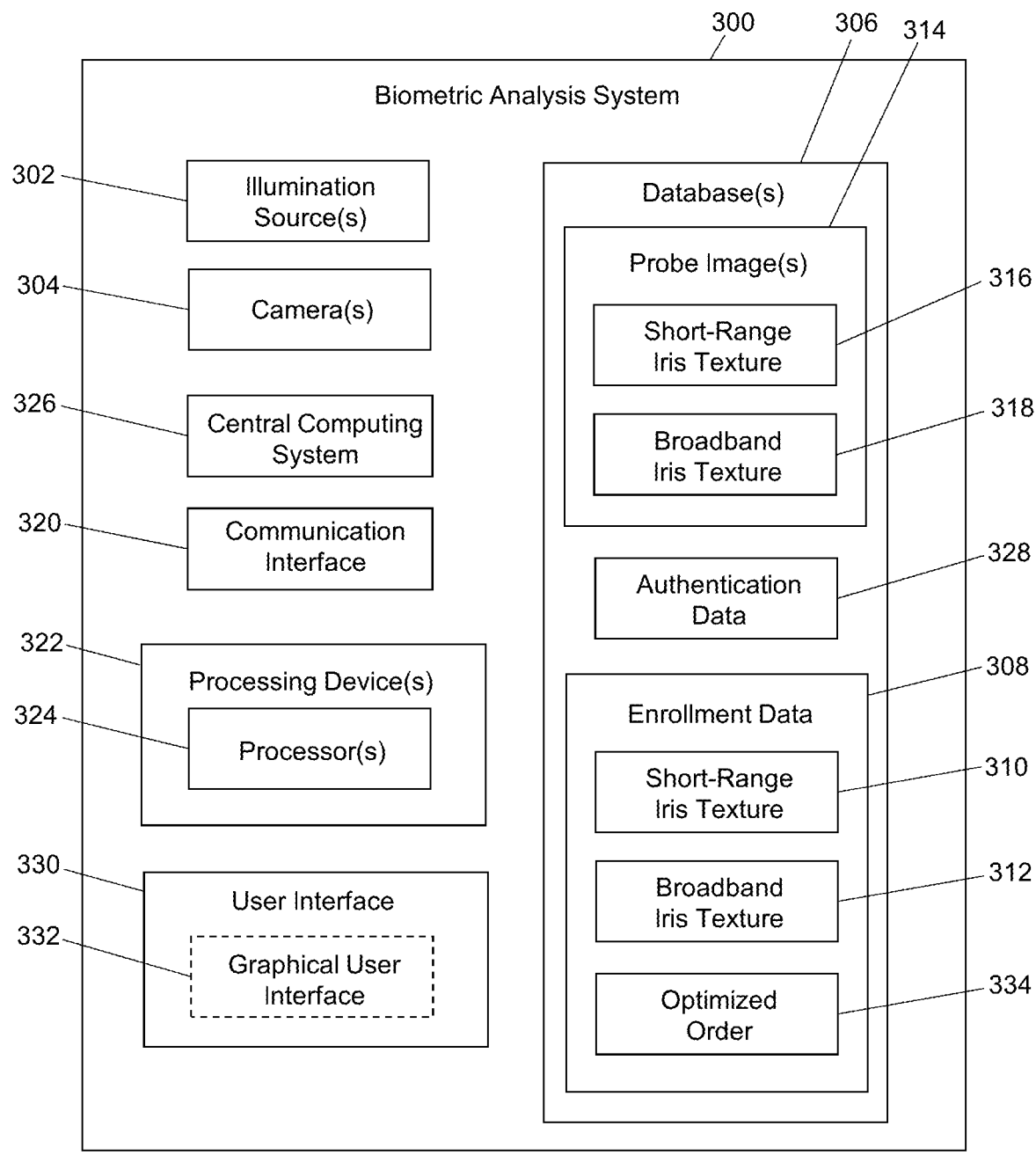
FIG. 14 is a block diagram of an exemplary system of enhancing biometric analysis matching efficiency in accordance with the present disclosure.

With reference to FIG. 14, a block diagram of an exemplary system 300 of enhancing biometric analysis matching efficiency (hereinafter "system 300") is provided. The exemplary system 300 can identify human non-readable features that can serve to classify coarse iris texture to accelerate iris matching using large databases. As will be discussed in greater detail below, the system 300 is configured to collect at least one probe image having both short-range and broadband iris textural information, and the broadband iris textural information is used to optimize the order of the enrollment images prior to analysis of the short-range iris textural information to determine whether a biometric authentic match exists between the probe image(s) and enrollment image(s).

Rather than relying solely on the short-range iris textural information for screening through an enrollment database during the authentication match determination, the system 300 relies on the broadband iris textural information as an initial analysis or screening step to optimize the order of the enrollment images within the enrollment database. Particularly, the broadband iris textural information is initially used to reorder the enrollment database with the closest broadband iris matches at the top or front of the enrollment database. After the order of the enrollment database has been optimized based on the broadband iris textural information, the system 300 applies the match determination based on the short-range iris textural information starting with the closest broadband iris textural information matches. By optimizing order of the enrollment images prior to the short-range iris textural information analysis, the system 300 ensures an authentication match can be achieved in a more efficient manner than the random matching performed by traditional authentication systems.

In some embodiments, rather than being used in combination with the short-range iris textural information, the broadband iris textural information can be used in combination with any other biometric modality, e.g., facial structure recognition, fingerprint scanning, gait analysis, infrared palm scanning, voice detection, combinations thereof, or the like. The broadband iris features can therefore be used to generate an optimized order for biometric modalities other than the short-range iris features. For example, the broadband iris features can be used to generate an optimized order of an enrollment database having fingerprint data, and the fingerprint matching analysis can be performed on the optimized order of the enrollment data starting with the enrolled fingerprints that have the closest broadband iris feature match.

The system 300 includes at least one illumination source 302 and at least one camera 304. The illumination source 302 can be a near infrared light. The illumination source 302 is configured to illuminate one or both irises of the subject. In some embodiments, the illumination source 302 can be configured to illuminate at least one facial feature surrounding the irises. In some embodiments, a single illumination source 302 can be used to illuminate the iris. In some embodiment, multiple independently controlled illumination sources 302 can be used to selectively illuminate one or both irises of the subject. Such illumination can occur simultaneously, synchronously, in a pulsed manner, or the like.

The camera 304 is configured to capture at least one image of one or both irises of the subject. The images captured by the camera 304 can be in the form of enrollment images electronically transmitted to and stored in at least one database 306 as enrollment data 308. The enrollment data 308 can be collected during enrollment of the subject into the system 300. The images of the enrollment data 308 include information or data corresponding to both short-range iris texture 310 and broadband iris texture 312 to be used during the authentication process. It should be understood that the enrollment data 308 can be collected over a period of time by at least one camera 304 such that the authentication process of the system 300 considers images captured during different lighting or environmental conditions, as well as biometric changes associated with the subject over time.

The images captured by the camera 304 can be in the form of probe images 314 electronically transmitted to and stored in the database 306. The probe images 314 include information or data corresponding to both short-range iris texture 316 and broadband iris texture 318. During the authentication process, capture of the at least one probe image 314 results in capture of iris biometric data (both short and broadband) associated with the iris of the subject. In some embodiments, capture of the short and broadband iris texture 316, 318 can be accomplished in the same step or image, such that additional operation of the system 300 is not needed. For example, the data found in capturing a probe image 314 that includes short-range iris features can also be used to extract the data needed for constructing a broadband iris feature vector. In some embodiments, capture of the short and broadband iris texture 316, 318 can be accomplished in two or more consecutive steps.

The system 300 can include a communication interface 320 configured to provide for a communication network between components of the system 300, thereby allowing data to be electronically transmitted and/or received by the components of the system 300. The system 300 can include at least one processing device 322 with a processor 324 for receiving and processing the data captured by the camera 304. In some embodiments, the processing device 322 can receive the data captured by the camera 304 and electronically transmits such captured data to a central computing system 326 for analysis and processing. The processing device 322 can be in communication with and programmed to control operation of the camera 304 and illumination source 302. The processing device 322 receives as input camera imagery (e.g., probe images 314), analyzes the camera imagery, provides an optimized order of the enrollment data 308, and contributes to the determination of whether a positive or negative match occurs. The processing device 322 can be in communication with the database 306.

The processing device 322 can receive as input the probe image 314 including both the short-range iris texture 316 and broadband iris texture 318. In some embodiments, the short and broadband iris texture 316, 318 can be input as a single image 314. In some embodiments, the short and broadband iris texture 316, 318 can be input as separate, individual images 314. The processing device 322 can generate an optimized order 334 of the enrollment data 308 based on execution of biometric analysis of the probe broadband iris texture 318 relative to the enrollment broadband iris texture 312. Traditional biometric authentication systems generally compare the short-range iris texture 316 of the probe image 314 to the short-range iris texture 310 of the enrollment data 308 in a random manner or order, until a potential match is found or a lack of a match is determined.

The exemplary system 300 seeks to improve the efficiency of the authentication process by reducing the time for determining whether a match between the probe image 314 and the enrollment data 308 is found. The processing device 322 performs the biometric analysis of the broadband iris texture 318, 312 first to locate potential matches based on the broadband or coarse features of the iris of the subject. Based on the results of the broadband iris texture 318, 312 analysis, the system 300 outputs and electronically stores the optimized order 334 of the enrollment data 308. Such optimized order 334 includes a listing of the enrollment data 308 ordered by closest match to furthest match between the probe and enrollment broadband iris texture 318, 312. For example, if the enrollment data 308 includes one hundred enrollment images for subjects with both broadband iris texture 312 and short-range iris texture 310 for each subject in a random order, the processing device 322 generates a re-ordered and optimized listing of the enrollment data 308 with the closest broadband iris texture 318, 312 match at the top of the list and decreasing closeness between the broadband iris texture 318, 312 leading to the end or bottom of the list. Such optimized order 334 ensures that the top of the list is enriched with irises having an increased chance of matching the probe iris based on the short-range iris features.

Once the optimized order 334 has been generated, the processing device 322 can analyze the iris biometric data for biometric authenticity based on the probe and enrollment short-range iris texture 316, 310 starting with the closest match between the probe and enrollment broadband iris texture 318, 312. Particularly, rather than randomly analyzing the enrollment data 308 until a match is found based on the short-range iris texture 316, 310, the processing device 322 initiates the biometric analysis with the enrollment data 308 matching the closest based on the broadband iris texture 318, 312. If a match between the short-range iris texture 316, 310 is not found with the closest broadband iris texture 318, 312 enrollment data 308, the processing device 322 moves down the optimized order 334 sequentially performing the biometric analysis using the short-range iris texture 316, 310 until a match is found (or a lack of a match is determined). By focusing first on the enrollment data 308 having the closest broadband iris texture 318, 312, a match based on the short-range iris texture 316, 310 is more likely to be found in a shorter time period than randomly analyzing the enrollment data 308.

In some embodiments, the optimized order 334 can be generated by implementing feature vectors for each of the probe and enrollment broadband iris texture 318, 312. For example, a set of distances between the feature vector of the probe broadband iris texture 318 and the enrollment broadband iris texture 312 can be generated by the processing device 322 based on the match of the coarse or broadband features. In some embodiments, the set of distances between the feature vectors can be defined by a Euclidian distance determination. The set of distances between the feature vectors can represent or characterize the similarity between the feature vector of the probe and enrollment broadband iris texture 318, 312.

For example, a short or small distance between the feature vectors can correspond with a close match between the probe and enrollment broadband iris texture 318, 310. Similarly, a long or large distance between the feature vectors can correspond with a far (e.g., low) match between the probe and enrollment broadband iris texture 318, 312. In such embodiments, the optimized order 334 can include enrollment data 308 with the shortest or smallest distance for the broadband iris texture 312 at the beginning or top of the list, with decreasing order based on increasing distance of the feature vectors. The shortest or smallest distance vectors can therefore be positioned at the top or start of the list, while the longest or largest distance vectors can be positioned at the bottom or end of the list. The processing device 322 can perform the biometric analysis based on the short-range iris texture 316, 310 starting with the short-range iris texture 310 corresponding with the broadband iris texture 312 having the shortest or smallest distance vectors. Based on the biometric analysis of the short-range iris texture 310, 316, the system 300 can determine the biometric authenticity of the subject.

In some embodiments, authentication matching can be performed between the probe image 314 and an N-membered enrollment database (e.g., the enrollment data 308). Such matching is performed by optimizing the order of the enrollment data 308 by the type of broadband iris texture 312, the intensity of the broadband iris texture 312, the size of the broadband iris texture 312, or the like. The system 300 includes a user interface 330. In some embodiments, the user interface 330 can include a display in the form of a graphical user interface (GUI) 332. In some embodiments, the interface 330 can include a numerical (or alphanumerical display), the illumination source 302, the camera 304, combinations thereof, or the like. For example, instructions for properly using the system 300 can be provided to the user via the GUI 332. The GUI 332 can include at least one display or indicator for communicating information to the subject, such as the results of the authentication process.

Although discussed herein as optimized ordering and authentication based on a single iris, it should be understood that in some embodiments, the system 300 can perform the optimized ordering of the enrollment data 308 and the authentication analysis on both irises of the subject. For example, rather than reordering of enrollment data 308 only for the left iris, enrollment data 308 for both left and right irises can be reordered and matched to respective left and right iris probe images 314. Authentication can further be independently performed on both irises of the subject using the rearranged and optimized enrollment data 308 for the respective left and right irises. Data associated with results of authentication can be electronically stored in the database 306 as authentication data 328. In some embodiments, the authentication data 328 can be used to improve operation of the system 300 through, e.g., machine learning, machine vision, or the like. In instances where the system 300 determines that a biometric match is not found based on the short-range iris features, the system 300 can request an additional probe image 314 from the subject.

As noted above, broadband features in the texture of an iris of the probe image 114 can focus on general features of the iris (as compared to exact features located in the short-range analysis), and can be determined using any number of schemes including but not limited to signal processing, computer vision methods, deep learning, machine learning, machine vision, or the like. In the case of machine learning, the system 300 can train on a variety of irises to capture and produce broadband iris features, and such broadband iris features learned by a network can be used to characterize an iris. In the case of signal processing or computer vision, the system 300 can use an algorithm for computational vision methods with a filter to detect and select radial transitions between a region of an iris with a broadband feature (e.g., a collarette) and a region beyond the broadband feature. For example, filters can be used to extract short-range iris texture, filters can be used to extract the broadband iris texture, human-detected iris features can be used, machine-detected iris patterns can be used (e.g., double ring of dots, flames, or the like). In the case of deep learning, the network can classify the coarse features if the network is first seeded with a number of exemplars. A loosely supervised deep learning network can therefore discover an optimal number of features. Such a network can further discern the level of each feature present in a probe iris and the levels in each of the list of enrolled irises.

The act of reordering the enrollment data 308 into the optimized order 334 can take into account that each enrollment iris includes encoded therein its characteristics that are precomputed and built in to the enrollment data 308. As an example, when presented with a probe iris, a list of distances can be computed between the probe iris and each of the enrolled irises. The distances are can be the basis of ordering. In some embodiments, pointers can be generated by the system 300 that counts from the closest to the furthest iris. Such pointers can be assigned to each enrolled iris. The matching engine executed by the processing device 322 can call each of the enrolled irises to be matched by counting through the assigned pointers in order, thereby ordering the attempted matches from most likely to match through least likely to match.

A variety of methods for optimizing the order the enrollment images can be used. In some embodiments, the enrollment images can be arranged based on the closest similarity between one or more broadband iris features of the probe image and the broadband iris features of the enrollment images (e.g., a 1, 2, 3, etc. order of enrollment images with 1 representing the closest broadband iris feature match, and decreasing in similarity). In some embodiments, Euclidian vector distance measurements relative to the probe can be used to determine the similarity between the broadband iris feature of the probe and enrollment images. In some embodiments, non-Euclidian vector distance measurements relative to the probe can be used to determine the similarity between the broadband iris feature of the probe and enrollment images. In some embodiments, after the enrollment images have been arranged based on decreasing similarity, only a percentage of the arranged enrollment images can be used for matching (e.g., top 50 enrollment images, top 500 enrollment images, top 5% enrollment images, top 15% enrollment images, or the like).

In some embodiments, the enrollment images can be arranged by grouping the enrollment images having similar broadband iris features (e.g., group all enrollment images having crypts, group all enrollment images having nodules, group all enrollment images having collarettes, or the like). In some embodiments, the enrollment images can be arranged by first grouping enrollment images having the existence of the same broadband iris feature (e.g., group all enrollment images having crypts), and next arranging the enrollment images within the selected group based on the intensity of the broadband iris feature shared by the group (e.g., a 1, 2, 3, etc. order of enrollment images with 1 representing the image having the greatest intensity of the broadband feature). In some embodiments, if the probe image includes only a single broadband iris feature, the arrangement can be performed only on enrollment images having the same broadband iris feature while the remaining enrollment images remain in random order.

In some embodiments, the broadband feature analysis can determine the degree to which the features in the probe image 314 are present, and the coarsely defined region where the feature is found, e.g., in one of two annular rings, inner half of the iris, or outer half of the iris. For example, the system 300 can determine the presence of horizontal or vertical stripes in the inner half of the iris closest to the pupil. The number of broadband iris features found in the texture of a probe iris can be combined (by the processing device 322) into a feature vector. In some embodiments, the feature vector can include a listing of features and their measured strength.

During the optimized ordering of the enrollment data 308, the measured feature vector of the probe iris for the broadband iris texture 318 can be used to organize the list of enrolled irises against which the probe image 314 will be compared to find matches. For example, feature vectors for each iris in the enrollment data 308 can be prepared by the system 300 in advance of the biometric matching process. The ordering of the list of enrolled irises can be on the basis of some or all of the broadband iris texture 318 features of the probe iris feature vector. In some embodiments, the compared feature vector of a probe image 314 and those of the enrolled irises can create a set of distances between the probe image 314 and each of the enrolled irises. In some embodiments, such distance can be defined by a Euclidean measure or any other means.

The distance measure can characterize the similarity of the feature vector of the probe image 314 to that of each enrolled iris in the enrollment data 308. The enrollment data 308 can be ordered from small to large distance, e.g., with irises most resembling the probe iris in terms of coarse or broadband features at the top of the list to those not resembling the probe iris at the bottom of the enrollment data 308 list. In some embodiments, the list of enrollment irises can be ordered based on at least one coarse or broadband textural feature that an enrolled iris shares in common with the probe iris. In such embodiments, the top of the list can include enrolled irises that share the common feature or features with the probe iris, while the enrolled irises that do not share the probe's features can be demoted to the bottom of the enrollment data 308 list.

As an example, N can represent the number of coarse or broadband features found in the iris ($F_1$, $F_2$, $F_N$), such as crypts, sunbursts, flames, or the like. A feature vector can include N features listing the amount or proportion of each of the N features found to be present in the iris texture in question. In some embodiments, the amount or proportion of each broadband feature can be represented as a numerical value between 0 and 1, with 0 indicating a complete absence of the broadband feature and 1 indicating the highest level of detection or presence of the broadband feature. In some embodiments, different numerical value ranges can be used to represent the magnitude of presence of each broadband iris feature. For example, if N=3 for three broadband features being analyzed, the feature vector of a first iris can be represented as (0, 1, 0). Such feature vector can indicate that feature $F_2$ is present while features $F_1$ and $F_3$ are absent. A second iris with a feature vector of (0.1, 0.8, 0.1) may be considered a match to the first iris vector of (0, 1, 0) due to the smaller $F_1$ and $F_3$ values and close relationship of the $F_2$ values. Particularly, a match can be found based on the similarity in the texture of the probe and enrollment irises.

However, a third iris with a feature vector of (0.4, 0, 0.6) may be considered a non-match to the first iris vector of (0, 1, 0) due to the difference in values for the $F_1$ and $F_3$ features and the non-existent $F_2$ feature. In some embodiments, the determination of match or non-match can be based on whether the magnitude of the feature is within a predetermined threshold range (e.g., within ±0.2). In some embodiments, comparison of two feature vectors to determine the degree to which broadband characteristics indicate a match can use a variety of methods including but not limited to binary comparison of at least one feature, Euclidean distance, non-Euclidean distance, a dot product analysis, a weighted dot product analysis, weighted distance measurement, mathematical comparison of two feature vectors relative to a threshold, or the like.

In some embodiments, the broadband iris features discussed herein can include the measurement of the presence of "crypts" in an iris as a particular broadband feature. In some embodiments, measurement of the presence of crypts can be performed without considering the exact position, size or relative orientation of the crypts. For example, rather than analyzing the probe and enrollment images for a specific quadrant or radial position of a broadband feature, the system can analyze the images to determine if the broadband feature is detected in any location of the iris. By analyzing the images without considering the exact position, size or relative orientation of the broadband feature, the system is capable of detecting potential matches even if the orientation of the captured iris is different from the orientation of the enrollment images. The presence of crypts on their own can indicate a potential broadband iris feature match, and such enrollment iris can be placed closer to the top of the optimized order 334. In some embodiments, the system 300 can consider the exact position, size and/or relative orientation of the crypts. For example, the system 300 can determine that the crypts are present only in the inner portion of the iris nearest the pupil in the enrollment image, while in a second iris (e.g., the probe image 314), similar crypts are found only in the other portion of the iris near the sclera. Based on such determination, the system 300 can indicate that the two irises do not match and places the enrollment iris closer to the bottom of the optimized order 334.

Rather than focusing on the exact position and/or shape of a broadband iris feature, the system 300 focuses on detecting the existence of the broadband iris feature. Generally, broadband iris features form either a ring of features surrounding the pupil (e.g., crypts) or features that loosely encircle the iris (e.g., nodules). As an example, if the probe image of the iris includes a ring of crypts, the system 300 can be configured to analyze the enrollment image to determine the existence of a ring of crypts in the enrollment image. If the system 300 determines that a ring of crypts exists in the enrollment image, whether of the same or different diameter and/or configuration as the crypts in the probe image, the system 300 can output at least a low-confidence match. If a match is found to exist based on these broadband iris features, the system 300 can place the enrollment iris closer to the top of the optimized order 334. The enrollment irises having the closest match based on broadband iris features can subsequently be biometrically analyzed based on the short-range iris features. The resulting search and analysis for an authentic iris based on the short-range iris features can take fewer match attempts than by pure chance, thereby speeding the overall matching and authentication process.

Particularly, the probe iris can be biometrically analyzed and compared with (e.g., matched to) each of the enrolled irises in the order determined by the previous steps. The optimized order 334 ensures that an authentic match (e.g., a match score that exceeds a matching threshold) will be found earlier in the list than would be found by pure chance. In some embodiments, for a list of N enrolled irises, on average, pure chance would match a probe to an authentic iris after N/2 attempts that resulted in false matches.

If the system 300 determines that the broadband feature vector of the probe image 314 and the broadband feature vector of the enrolled iris meet or exceed a predetermined level, referred to herein as a threshold, a positive match can be output and the enrolled iris can be placed closer to the top or start of the optimized order 334. If the broadband iris features of the probe image 314 and of the enrolled iris do not meet the predetermined threshold, a non-match can be output and the enrolled iris can be placed closer to the bottom or end of the optimized order 334.

In some embodiments, a single broadband iris feature can be used for the biometric analysis, and the presence or absence of such broadband iris feature can be used reorder the enrollment data 308. In some embodiments, multiple broadband iris features can be combined in a feature vector of multiple dimensions to reorder the enrollment data 308. In some embodiments, the binary presence or absence of an iris feature can be used for the optimized order 334. In some embodiments, a Euclidean distance between the probe and enrolled iris can be used to generate the optimized order 334. In some embodiments, a distance other than strictly Euclidean can be used. In some embodiments, only part of the enrollment data 308 can be reordered. For example, the neighboring irises (those with a sufficiently small distance to the probe iris) can be pulled out of line and promoted to the front of the line, while the remaining enrollment irises can retain their original order.

In some embodiments, varying processing of characterizing the coarse or broadband features of an iris can be implemented. In some embodiments, pattern recognition can use rationally designed filters to indicate the presence of various types of iris texture as well as the physical location of patches of a particular type of texture. For example, one filter can respond to vertical stripes while another filter can respond to horizontal stripes, and a third filter can respond to a checkerboard pattern. Filters can be used to search for the local or global presence of a particular pattern. For example, iris A can be detected to have horizontal stripes or iris B can be detected to have vertical stripes in the inner half of the iris nearest the pupil. In some embodiments, machine learning and/or machine vision can be used to train on databases of iris texture to find characteristics that distinguish one group of irises from another Such patterns or textures can be extracted by the machine learning and/or machine vision operation of the system 300 to generate the optimized order 334 of the enrolled data 308 prior to short-range iris feature authentication.

In some embodiments, the system 300 can be used to reorder the enrollment data 308 and/or authenticate the subject based on analysis of a single iris. In some embodiments, the system 300 can be used to reorder the enrollment data 308 and/or authenticate the subject based on analysis of both the left and right irises. In such embodiments, at least one camera 304 can produce probe images 314 of both the left and right irises of the subject, and the system 300 analyzes the probe images 314 relative to respective left and right iris enrollment images of the subject. The system 300 can fuse the results increasing the chance of determining a subsequent match based on the short-range iris features. For example, the system 300 can biometrically analyze the broadband iris features for both the left and right enrolled irises to generate the optimized order 334 for both the left and right enrolled iris pairs. By finding that both the left and right enrolled irises match the respective coarse or broadband features of the probe irises, and placing the enrolled irises closer to the top of the optimized order 334, the system 300 ensures an efficient matching process based on the short-range features.

As noted above, based on the distinguished textural features, the optimized order of enrollment data can be generated. By generating the optimized order of the enrollment data based on existence of or lack of broadband iris features (such as crypts) depending on the character of the probe iris, the number of matches needed to find an authentic match can be reduced to less than N/2 (less than the number in the case of pure chance authentication).

As an example, the system 300 can include a database with N enrollment images arranged in random order (e.g., with no regard to iris texture). On average, approximately N/2 irises are examined by traditional biometric analysis systems before a match with an authentic probe is expected. It is understood that for rejecting an impostor, the system 300 would analyze all N irises. The example discussed herein therefore refers to an instance of an authentic probe.

It can be assumed that some fraction of the total enrollment database exhibits a particular feature (e.g., Fuchs' Crypts), while the rest of the enrollment database does not. Experimentation was performed to determine the average or expected number of attempted matches to find the authentic match if the enrollment database is reordered by positioning all enrollments with the particular broadband feature together first and demoting all enrollments without the particular broadband feature to positions in the enrollment list below the selected group. For example, all of the enrolled irises with crypts can be grouped at the top of the optimized order followed by enrolled irises without crypts.

Figure 15:
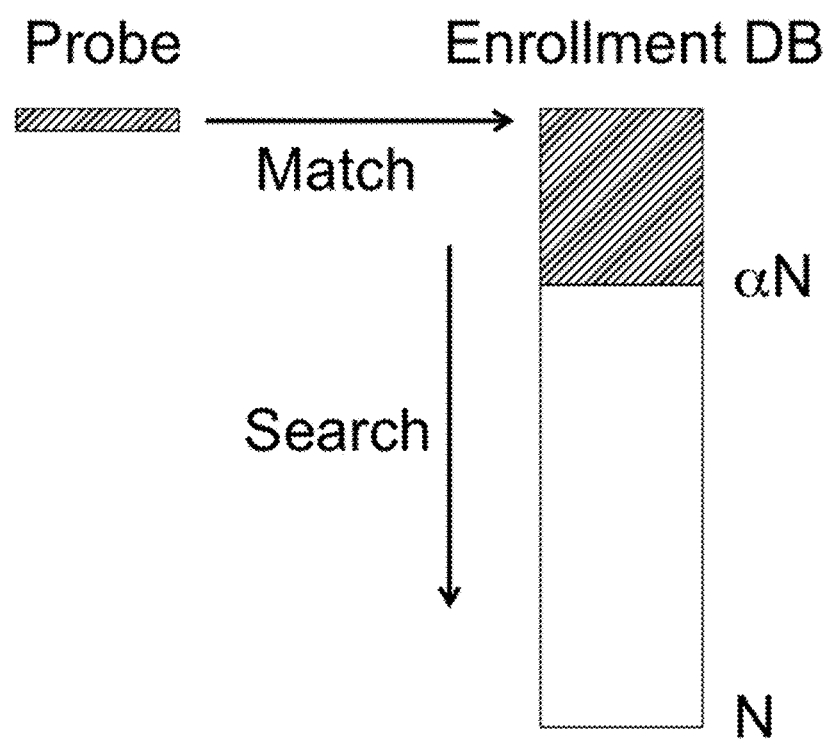
FIG. 15 is a diagrammatic representation of an N-membered enrollment database reordered to provide top priority to irises most closely matching broadband features of a probe iris.

FIG. 15 is a diagrammatic representation of an N-membered enrollment database (e.g., enrollment data 308) used to determine the acceleration for matching if optimized ordering is generated. Particularly, FIG. 15 schematically illustrates the reordered enrollment database in terms of a fraction $\alpha$ of enrolled irises with the particular feature and a probability P of correctly identifying the feature in the probe iris. Thus, the probe iris can be incorrectly evaluated to have the broadband feature when the probe iris really does not or evaluated to not have the broadband feature when it really does with a probability of (1−P).

If the broadband feature of the probe iris has been correctly evaluated, the authentic match can occur in the top group of the enrollment database after an average of $\alpha N/2$ attempts. The probability of this event can be represented by P. However, if the broadband feature of the probe has been incorrectly evaluated (probability, 1−P), then on average, $\alpha N/2+(1-\alpha)N=N(1-\alpha/2)$ match attempts would occur before an authentic match. Weighting each outcome by its probability, the expected number of matches $N_{exp}$ can be represented by Equation 1.

$$N_{exp} = P \cdot \alpha \cdot \frac{N}{2} + (1-P) \cdot \left(1 - \frac{\alpha}{2}\right) \cdot N = \frac{N}{2} \cdot (\alpha + 1 - P) \quad (1)$$

Comparing the number of attempts to the number without reordering the enrollment database (N/2) provides an acceleration or speed-up factor A represented by Equation 2.

$$A = \frac{1}{\alpha + 1 - P} \quad (2)$$

For example, using Fuchs' Crypts as the distinguishing broadband feature, $\alpha=0.4$ and $P=0.9$, resulting in A=2.

However, if α=0.2 and P=0.95 (as may be the case with five evenly distributed groups, such as fingerprint classes and robust evaluation), A=4. As the size of the prioritized group shrinks and the probability of correctly assessing the feature that distinguishes the group increases, A increases with A~1/α with high probability of correct feature assessment and A~1/(1−P) as the fraction α becomes small.

In some embodiments, a different scheme of database ordering can be implemented if the degree of each of several (e.g., N) features were available. In such embodiments, each enrolled iris can reside in an N-dimensional space and the distance in such space (e.g., Euclidean distance) between a probe and an enrollment iris would determine the matching order.

Figure 16:
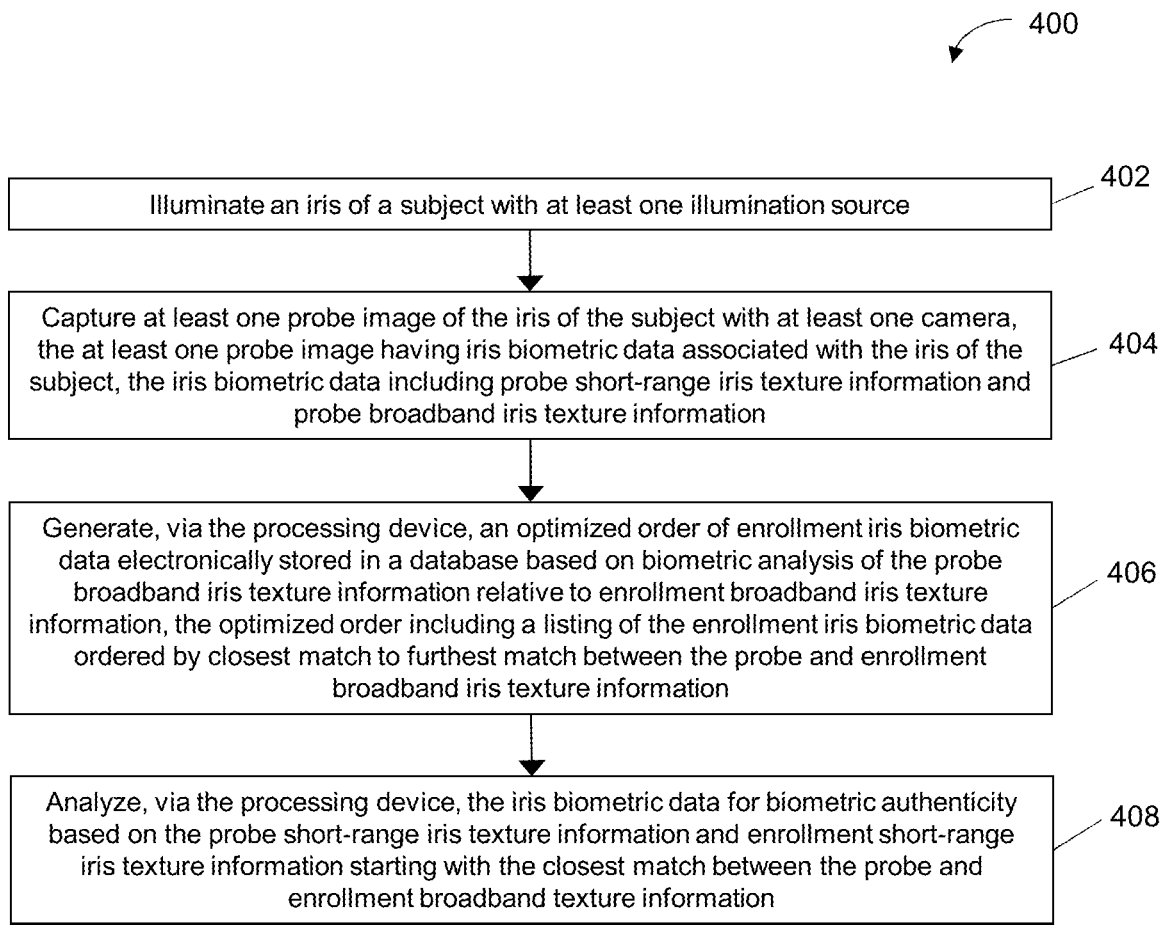
FIG. 16 is a diagrammatic representation of an N-membered enrollment database reordered to provide top priority to irises most closely matching broadband features of a probe iris.

FIG. 16 is a flowchart illustrating an exemplary process 400 of implementing the system 300. To begin, at step 402, the iris of the subject is illuminated with at least one illumination source. At step 404, at least one probe image of the iris of the subject can be captured with at least one camera. Each of the probe images includes iris biometric data in the form of short and broadband iris texture information. At step 406, a processing device can receive as input the probe image and generates an optimized order of enrollment iris biometric data electronically stored in a database based on biometric analysis of the probe broadband iris texture information relative to enrollment broadband iris texture information. The optimized order includes a listing of the enrollment iris biometric data ordered by closest match to furthest match between the probe and enrollment broadband iris texture information. At step 408, the processing device can analyze the iris biometric data for biometric authenticity based on the probe short-range iris texture information and enrollment short-range iris texture information starting with the closest match between the probe and enrollment broadband texture information.

Figure 17:
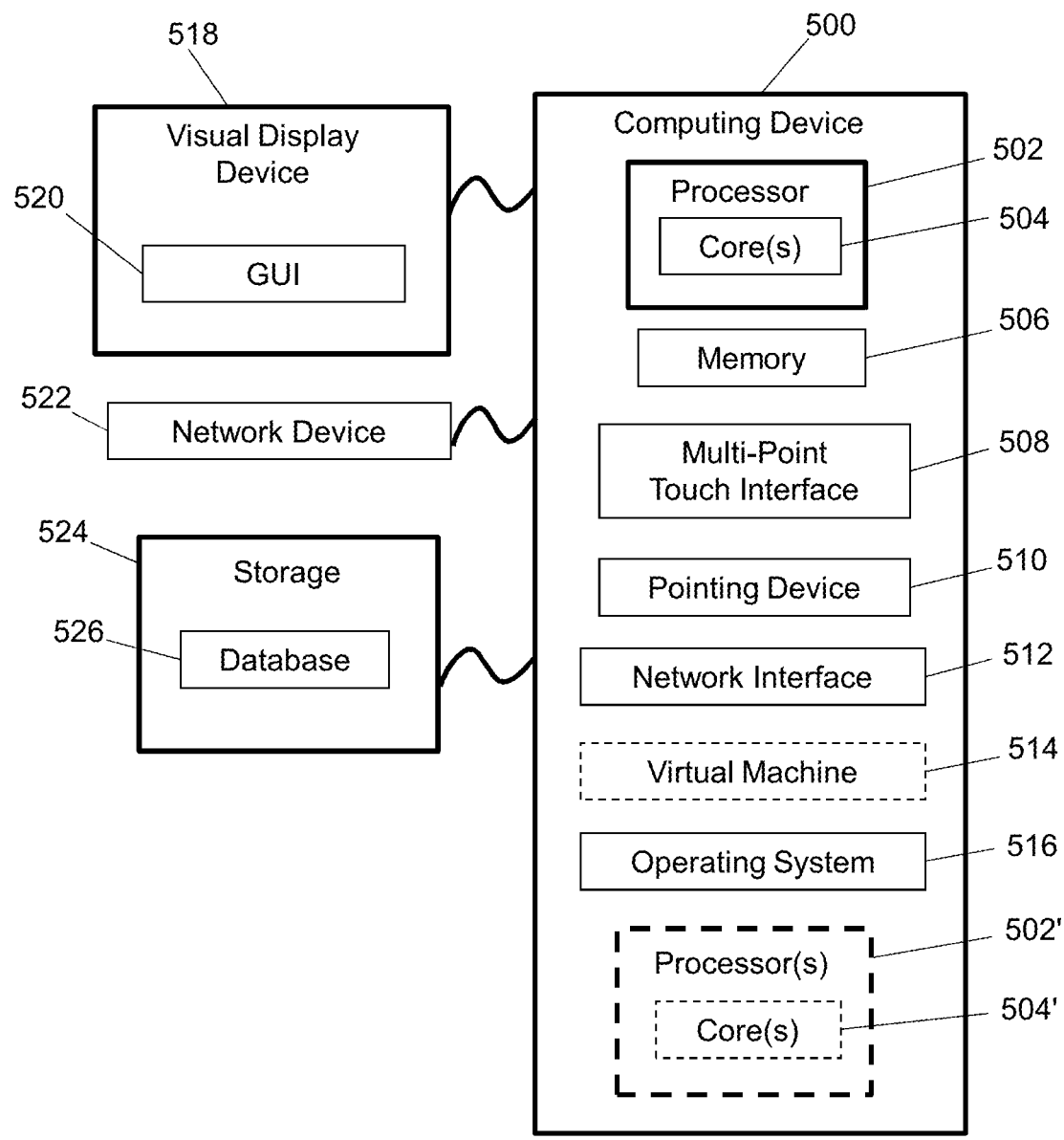
FIG. 17 is a block diagram of an exemplary computing device for implementing the exemplary systems of biometric analysis in accordance with the present disclosure.

FIG. 17 is a block diagram of a computing device 500 in accordance with exemplary embodiments of the present disclosure. The computing device 500 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 506 included in the computing device 500 may store computer-readable and computer-executable instructions or software for implementing exemplary embodiments of the present disclosure (e.g., instructions for operating the illumination sources, instructions for operating the cameras, instructions for operating the processing device, instructions for operating the communication interface, instructions for operating the user interface, instructions for operating the central computing system, combinations thereof, or the like). The computing device 500 also includes configurable and/or programmable processor 502 and associated core 504, and optionally, one or more additional configurable and/or programmable processor(s) 502' and associated core(s) 504' (for example, in the case of computer systems having multiple processors/cores), for executing computer-readable and computer-executable instructions or software stored in the memory 506 and other programs for controlling system hardware. Processor 502 and processor(s) 502' may each be a single core processor or multiple core (504 and 504') processor.

Virtualization may be employed in the computing device 500 so that infrastructure and resources in the computing device 500 may be shared dynamically. A virtual machine 514 may be provided to handle a process running on multiple processors so that the process appears to be using only one computing resource rather than multiple computing resources. Multiple virtual machines may also be used with one processor. Memory 506 may include a computer system memory or random access memory, such as DRAM, SRAM, EDO RAM, and the like. Memory 506 may include other types of memory as well, or combinations thereof.

A user may interact with the computing device 500 through a visual display device 518 (e.g., a personal computer, a mobile smart device, or the like), such as a computer monitor, which may display at least one user interface 520 (e.g., a graphical user interface) that may be provided in accordance with exemplary embodiments. The computing device 500 may include other I/O devices for receiving input from a user, for example, a camera, a keyboard, a fingerprint scanner, microphone, or any suitable multi-point touch interface 508, a pointing device 510 (e.g., a mouse). The keyboard 508 and the pointing device 510 may be coupled to the visual display device 518. The computing device 500 may include other suitable conventional I/O peripherals.

The computing device 500 may also include at least one storage device 524, such as a hard-drive, CD-ROM, eMMC (MultiMediaCard), SD (secure digital) card, flash drive, non-volatile storage media, or other computer readable media, for storing data and computer-readable instructions and/or software that implement exemplary embodiments of the biometric analysis systems described herein. Exemplary storage device 524 may also store at least one database 526 for storing any suitable information required to implement exemplary embodiments. For example, exemplary storage device 524 can store at least one database 526 for storing information, such as data relating to probe images, enrollment data, authentication data, combinations thereof, or the like, and computer-readable instructions and/or software that implement exemplary embodiments described herein. The databases 526 may be updated by manually or automatically at any suitable time to add, delete, and/or update one or more items in the databases.

The computing device 500 can include a network interface 512 configured to interface via at least one network device 522 with one or more networks, for example, a Local Area Network (LAN), a Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 512 may include a built-in network adapter, a network interface card, a PCMCIA network card, Pa CI/PCIe network adapter, an SD adapter, a Bluetooth adapter, a card bus network adapter, a wireless network adapter, a USB network adapter, a modem or any other device suitable for interfacing the computing device 500 to any type of network capable of communication and performing the operations described herein. Moreover, the computing device 500 may be any computer system, such as a workstation, desktop computer, server, laptop, handheld computer, tablet computer (e.g., the tablet computer), mobile computing or communication device (e.g., the smart phone communication device), an embedded computing platform, or other form of computing or telecommunications device that is capable of communication and that has sufficient processor power and memory capacity to perform the operations described herein.

The computing device 500 may run any operating system 516, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 516 may be run in native mode or emulated mode. In an exemplary embodiment, the operating system 516 may be run on one or more cloud machine instances.

Figure 18:
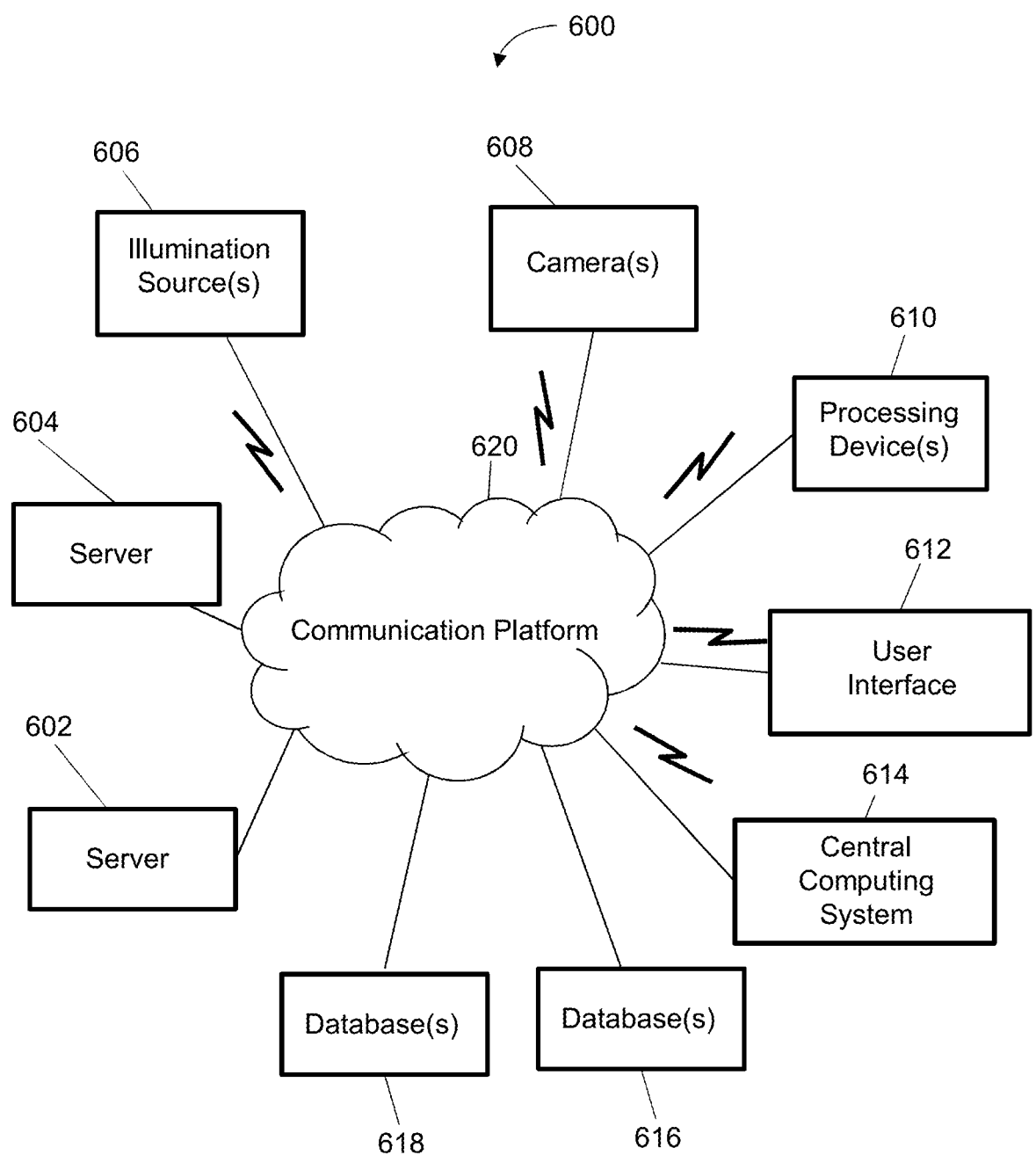
FIG. 18 is a block diagram of an exemplary biometric analysis system environment in accordance with the present disclosure.

FIG. 18 is a block diagram of an exemplary biometric analysis system environment 600 in accordance with exemplary embodiments of the present disclosure. The environment 600 can include servers 602, 604 configured to be in communication with at least one illumination source 606, at least one camera 608, at least one processing device 610, a user interface 612, and a central computing system 614 via a communication platform 620, which can be any network over which information can be transmitted between devices communicatively coupled to the network. For example, the communication platform 620 can be the Internet, Intranet, virtual private network (VPN), wide area network (WAN), local area network (LAN), and the like. In some embodiments, the communication platform 620 can be part of a cloud environment.

The environment 600 can include repositories or databases 616, 618, which can be in communication with the servers 602, 604, as well as the at least one illumination source 606, at least one camera 608, at least one processing device 610, user interface 612, and central computing system 614, via the communications platform 620.

In exemplary embodiments, the servers 602, 604, the at least one illumination source 606, at least one camera 608, at least one processing device 610, user interface 612, and central computing system 614 can be implemented as computing devices (e.g., computing device 500). Those skilled in the art will recognize that the databases 616, 618 can be incorporated into at least one of the servers 602, 604. In some embodiments, the databases 616, 618 can store data relating to probe images, enrollment data, authentication data, combinations thereof, or the like, and such data can be distributed over multiple databases 616, 618.

The exemplary systems disclosed herein provide for accurate and/or efficient biometric authentication. Although the present disclosure has sometimes explained the biometric analysis matching accuracy enhancing system and the biometric analysis matching efficiency enhancing system using separate explanations and/or as separate systems, it should be understood by a person of ordinary skill in the art that one or more components of each of systems can be presented in combination, such that a system is provide for enhancing both accuracy and efficiency. In some embodiments, the exemplary systems can function together as a single biometric analysis system, with each system providing a level of accuracy and/or efficiency for biometric authentication.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A system at least for enhancing biometric analysis matching accuracy, comprising:
    at least one camera configured to capture at least one probe image of an iris of a subject, the at least one probe image having iris biometric data associated with the iris of the subject, the iris biometric data including probe short-range iris texture information and probe broadband iris texture information; and
    a processing device in communication with the at least one camera, the processing device configured to:
        (i) analyze the probe short-range iris texture information of the at least one probe image for iris biometric authenticity;
        (ii) analyze the probe broadband iris texture information of the at least one probe image for iris biometric authenticity; and
        (iii) based on the biometric authenticity of the probe short-range iris texture information and the probe broadband iris texture information, determine the biometric authenticity of the subject.

2. The system of claim 1, comprising at least one illumination source configured to illuminate an iris of a subject, wherein the processing device is in communication with the at least one illumination source.

3. The system of claim 2, wherein the at least one illumination source is configured to illuminate the iris of the subject with near infrared light.

4. The system of claim 2, wherein the at least one camera is configured to capture the at least one probe image of the iris of the subject during illumination of the subject with the at least one illumination source.

5. The system of claim 1, wherein analyzing the probe short-range iris texture information for biometric authenticity comprises comparing the probe short-range iris texture information to enrollment short-range iris texture information.

6. The system of claim 1, wherein analyzing the probe broadband iris texture information for biometric authenticity comprises comparing the probe broadband iris texture information to enrollment broadband iris texture information.

7. The system of claim 1, wherein the processing device is configured to apply the biometric authenticity determination based on the probe broadband iris texture information as a final deciding factor in the biometric authenticity of the subject.

8. The system of claim 1, wherein the at least one probe image includes iris biometric data associated with left and right irises of the subject, and wherein the processing device is configured to analyze the probe short-range and broadband iris texture information for both the left and right irises of the subject.

9. The system of claim 1, wherein the processing device is configured to generate a short-range score corresponding with a degree to which the iris biometric authenticity is found for the probe short-range iris texture information, and wherein if the generated score for the iris biometric authenticity of the probe short-range iris texture information is better than a short-range threshold value, the processing device is configured to analyze the probe broadband iris texture information of the at least one probe image for the iris biometric authenticity.

10. The system of claim 9, wherein the processing device is configured to generate a broadband score corresponding with a degree to which the iris biometric authenticity is found for the probe broadband iris texture information.

11. The system of claim 10, wherein if the generated broadband score is better than a broadband threshold value, positive biometric authenticity of the subject is determined.

12. A method at least for enhancing biometric analysis matching accuracy, comprising:
- capturing at least one probe image of an iris of a subject with at least one camera, the at least one probe image having iris biometric data associated with the iris of the subject, the iris biometric data including probe short-range iris texture information and probe broadband iris texture information;
- analyzing, via a processing device, the probe short-range iris texture information of the at least one probe image for iris biometric authenticity;
- analyzing, via the processing device, the probe broadband iris texture information of the at least one probe image for iris biometric authenticity; and
- based on the biometric authenticity of the probe short-range iris texture information and the probe broadband iris texture information, determining the biometric authenticity of the subject.

13. The method of claim 12, comprising illuminating the iris of the subject with at least one illumination source.

14. The method of claim 13, comprising illuminating the iris of the subject with near infrared light from the at least one illumination source.

15. The method of claim 13, comprising capturing the at least one probe image of the iris of the subject during illumination of the subject with the at least one illumination source.

16. The method of claim 12, wherein analyzing the probe short-range iris texture information for biometric authenticity comprises comparing the probe short-range iris texture information to enrollment short-range iris texture information.

17. The method of claim 12, wherein analyzing the probe broadband iris texture information for biometric authenticity comprises comparing the probe broadband iris texture information to enrollment broadband iris texture information.

18. The method of claim 12, comprising applying, via the processing device, the biometric authenticity determination based on the probe broadband iris texture information as a final deciding factor in the biometric authenticity of the subject.

19. The method of claim 12, wherein the at least one probe image includes iris biometric data associated with left and right irises of the subject, and the method comprises analyzing, via the processing device, the probe short-range and broadband iris texture information for both the left and right irises of the subject.

20. A non-transitory computer-readable medium storing instructions at least for enhancing biometric analysis matching accuracy that are executable by a processing device, wherein execution of the instructions by the processing device causes the processing device to:
- capture at least one probe image of an iris of a subject with at least one camera, the at least one probe image having iris biometric data associated with the iris of the subject, the iris biometric data including probe short-range iris texture information and probe broadband iris texture information;
- analyze, via a processing device, the probe short-range iris texture information of the at least one probe image for iris biometric authenticity;
- analyze, via the processing device, the probe broadband iris texture information of the at least one probe image for iris biometric authenticity; and
- based on the biometric authenticity of the probe short-range iris texture information and the probe broadband iris texture information, determine the biometric authenticity of the subject.

* * * * *